US007822682B2

(12) United States Patent
Arnold et al.

(10) Patent No.: US 7,822,682 B2
(45) Date of Patent: Oct. 26, 2010

(54) SYSTEM AND METHOD FOR ENHANCING SUPPLY CHAIN TRANSACTIONS

(75) Inventors: Brian L. Arnold, Midland Park, NJ (US); Paul H. Simpson, Ridgewood, NJ (US); Thomas Steven Fitzgerald, Monroe Township, NJ (US); Pik Kwan Lo, Ridgewood, NJ (US); James K. Wilson, Mead, CO (US); John C. Brockwell, Superior, CO (US); Michael F. Quinn, Pound Ridge, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 11/406,364

(22) Filed: Apr. 19, 2006

(65) Prior Publication Data

US 2007/0192216 A1 Aug. 16, 2007

Related U.S. Application Data

(63) Continuation-in-part of application No. 11/147,204, filed on Jun. 8, 2005.

(51) Int. Cl.
G06Q 40/00 (2006.01)
(52) U.S. Cl. .......................................... 705/39; 705/40
(58) Field of Classification Search ..................... 705/7, 705/39–40
See application file for complete search history.

(56) References Cited

U.S. PATENT DOCUMENTS

| 3,653,480 A | 4/1972 | Yamamoto et al. |
| 3,938,090 A | 2/1976 | Borison et al. |
| 4,050,375 A | 9/1977 | Orleans |
| 4,141,078 A | 2/1979 | Bridges et al. |
| 4,169,285 A | 9/1979 | Walker |
| 4,205,780 A | 6/1980 | Burns |
| 4,264,808 A | 4/1981 | Owens et al. |
| 4,321,672 A | 3/1982 | Braun et al. |
| 4,385,285 A | 5/1983 | Horst et al. |
| 4,396,985 A | 8/1983 | Ohara |

(Continued)

FOREIGN PATENT DOCUMENTS

EP 0099999 7/1983

(Continued)

OTHER PUBLICATIONS

Manco et al., A Framework for Adaptive Mail Classification, 14th IEEE Conference on with Artificial Intelligence (ICTAI'02), Nov. 4, 2002, p. 387.

(Continued)

Primary Examiner—Thu Thao Havan
(74) Attorney, Agent, or Firm—Hunton & Williams LLP

(57) ABSTRACT

A system and method for processing particulars of a transaction over a network. The system comprises a supply chain tracking module for receiving supply chain event data from at least one supply chain monitor, the supply chain data relating to the condition or location of an item along a supply chain. The system also comprises a term and requirements module for receiving initial terms and requirements associated with the transaction and for generating modified terms and requirements based on supply chain event data and on at least one value algorithm, the modified terms and requirements being generated while the item is still in the supply chain.

21 Claims, 7 Drawing Sheets

U.S. PATENT DOCUMENTS

| | | |
|---|---|---|
| 4,443,027 A | 4/1984 | McNeely et al. |
| 4,453,074 A | 6/1984 | Weinstein |
| 4,454,414 A | 6/1984 | Benton |
| RE31,692 E | 10/1984 | Tyburski et al. |
| 4,495,018 A | 1/1985 | Vohrer |
| 4,575,621 A | 3/1986 | Dreifus |
| 4,605,844 A | 8/1986 | Haggan |
| 4,614,861 A | 9/1986 | Pavlov et al. |
| 4,617,457 A | 10/1986 | Myers |
| 4,648,038 A | 3/1987 | Roberts et al. |
| 4,650,981 A | 3/1987 | Foletta |
| 4,669,730 A | 6/1987 | Small |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian |
| 4,701,601 A | 10/1987 | Francini et al. |
| 4,713,761 A | 12/1987 | Sharpe et al. |
| 4,739,478 A | 4/1988 | Roberts et al. |
| 4,742,457 A | 5/1988 | Leon et al. |
| 4,752,676 A | 6/1988 | Leonard et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston |
| 4,817,949 A | 4/1989 | Bachman et al. |
| 4,823,264 A | 4/1989 | Deming |
| 4,845,347 A | 7/1989 | McCrindle |
| 4,859,837 A | 8/1989 | Halpern |
| 4,893,333 A | 1/1990 | Baran et al. |
| 4,931,793 A | 6/1990 | Fuhrmann et al. |
| 4,933,842 A | 6/1990 | Durbinet et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,025,139 A | 6/1991 | Halliburton |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara et al. |
| 5,111,395 A | 5/1992 | Smith |
| 5,121,469 A | 6/1992 | Richards et al. |
| 5,121,945 A | 6/1992 | Thomson et al. |
| 5,122,950 A | 6/1992 | Mee |
| 5,136,502 A | 8/1992 | Van Remortel et al. |
| 5,173,851 A | 12/1992 | Off et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,222,019 A | 6/1993 | Yoshino et al. |
| 5,224,034 A | 6/1993 | Katz et al. |
| 5,225,978 A | 7/1993 | Peterson |
| 5,237,159 A | 8/1993 | Stephens |
| 5,237,620 A | 8/1993 | Deaton |
| 5,257,369 A | 10/1993 | Skeen et al. |
| 5,257,486 A | 11/1993 | Holmwall |
| 5,265,007 A | 11/1993 | Barnhard, Jr. et al. |
| 5,270,922 A | 12/1993 | Higgins |
| 5,276,311 A | 1/1994 | Hennige |
| 5,283,829 A | 2/1994 | Anderson |
| 5,287,269 A | 2/1994 | Dorrough et al. |
| 5,297,032 A | 3/1994 | Trojan et al. |
| 5,305,196 A | 4/1994 | Deaton et al. |
| 5,305,200 A | 4/1994 | Hartheimer et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,327,508 A | 7/1994 | Deaton et al. |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | Vanhorn |
| 5,373,550 A | 12/1994 | Campbell |
| 5,382,784 A | 1/1995 | Eberhardt |
| 5,396,417 A | 3/1995 | Burks et al. |
| 5,402,474 A | 3/1995 | Miller |
| 5,412,190 A | 5/1995 | Kopesec |
| 5,413,341 A | 5/1995 | Lieberman |
| 5,419,890 A | 5/1995 | Saidi |
| 5,424,938 A | 6/1995 | Wagner |
| 5,428,684 A | 6/1995 | Akiyama et al. |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glaser et al. |
| 5,446,740 A | 8/1995 | Yien |
| 5,448,471 A | 9/1995 | Deaton et al. |
| 5,454,104 A | 9/1995 | Steidlmayer et al. |
| 5,459,482 A | 10/1995 | Orlen |
| 5,462,438 A | 10/1995 | Becker et al. |
| 5,465,206 A | 11/1995 | Hilt et al. |
| 5,477,040 A | 12/1995 | Lalonde |
| 5,479,494 A | 12/1995 | Clitherow |
| 5,481,094 A | 1/1996 | Suda |
| 5,483,445 A | 1/1996 | Pickering |
| 5,484,988 A | 1/1996 | Hills |
| 5,495,981 A | 3/1996 | Warther |
| 5,497,317 A | 3/1996 | Hawkins et al. |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | Mcallister |
| 5,517,406 A | 5/1996 | Harris et al. |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,557,798 A | 9/1996 | Skeen et al. |
| 5,563,400 A | 10/1996 | Le roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,592,379 A | 1/1997 | Finfrock et al. |
| 5,599,528 A | 2/1997 | Igaki |
| 5,602,936 A | 2/1997 | Green et al. |
| 5,603,025 A | 2/1997 | Tabb |
| 5,612,868 A | 3/1997 | Off et al. |
| 5,615,109 A | 3/1997 | Eder |
| 5,617,474 A | 4/1997 | Ditzig et al. |
| 5,619,558 A | 4/1997 | Jheeta |

| | | | | | |
|---|---|---|---|---|---|
| 5,621,201 A | 4/1997 | Langhans | 5,845,266 A | 12/1998 | Lupien et al. |
| 5,621,812 A | 4/1997 | Deaton et al. | 5,852,811 A | 12/1998 | Atkins |
| 5,638,457 A | 6/1997 | Deaton et al. | 5,852,812 A | 12/1998 | Reeder |
| 5,640,577 A | 6/1997 | Scharmer | 5,859,419 A | 1/1999 | Wynn |
| 5,642,419 A | 6/1997 | Rosen | 5,864,609 A | 1/1999 | Cross et al. |
| 5,642,485 A | 6/1997 | Deaton et al. | 5,864,827 A | 1/1999 | Wilson |
| 5,644,723 A | 7/1997 | Deaton et al. | 5,870,456 A | 2/1999 | Rogers |
| 5,644,778 A | 7/1997 | Burks et al. | 5,870,721 A | 2/1999 | Norris |
| 5,649,114 A | 7/1997 | Deaton et al. | 5,870,723 A | 2/1999 | Pare |
| 5,649,117 A | 7/1997 | Landry | 5,870,725 A | 2/1999 | Bellinger et al. |
| 5,649,186 A | 7/1997 | Ferguson | 5,873,072 A | 2/1999 | Kight |
| 5,652,786 A | 7/1997 | Rogers | 5,878,141 A | 3/1999 | Daly et al. |
| 5,659,165 A | 8/1997 | Jennings | 5,883,377 A | 3/1999 | Chapin, Jr. |
| 5,659,469 A | 8/1997 | Deaton et al. | 5,883,810 A | 3/1999 | Franklin et al. |
| 5,659,741 A | 8/1997 | Eberhardt | 5,884,288 A | 3/1999 | Chang |
| 5,666,493 A | 9/1997 | Wojcik et al. | 5,884,290 A | 3/1999 | Smorodinsky et al. |
| 5,675,746 A | 10/1997 | Marshall | 5,890,140 A | 3/1999 | Clark et al. |
| 5,677,521 A | 10/1997 | Garrou | 5,897,625 A | 4/1999 | Gustin |
| 5,677,955 A | 10/1997 | Doggett et al. | 5,898,157 A | 4/1999 | Mangili et al. |
| 5,679,938 A | 10/1997 | Templeton | 5,903,881 A | 5/1999 | Schrader |
| 5,679,940 A | 10/1997 | Templeton | 5,907,142 A | 5/1999 | Kelsey |
| 5,680,459 A | 10/1997 | Hook et al. | 5,910,896 A | 6/1999 | Hahn-Carlson |
| 5,687,250 A | 11/1997 | Curley et al. | 5,910,988 A | 6/1999 | Ballard |
| 5,687,322 A | 11/1997 | Deaton et al. | 5,913,214 A | 6/1999 | Madnick et al. |
| 5,692,132 A | 11/1997 | Hogan | 5,915,246 A | 6/1999 | Patterson et al. |
| 5,698,837 A | 12/1997 | Furuta | 5,917,965 A | 6/1999 | Cahill et al. |
| 5,699,528 A | 12/1997 | Hogan | 5,918,218 A | 6/1999 | Harris et al. |
| 5,703,344 A | 12/1997 | Bezy et al. | 5,920,847 A | 7/1999 | Kolling et al. |
| 5,704,044 A | 12/1997 | Tarter et al. | 5,922,044 A | 7/1999 | Banthia |
| 5,706,502 A | 1/1998 | Foley et al. | 5,928,082 A | 7/1999 | Clapper |
| 5,708,422 A | 1/1998 | Blonder et al. | 5,930,778 A | 7/1999 | Geer |
| 5,710,889 A | 1/1998 | Clark et al. | 5,940,810 A | 8/1999 | Traub et al. |
| 5,715,298 A | 2/1998 | Rogers | 5,940,811 A | 8/1999 | Norris |
| 5,715,314 A | 2/1998 | Payne | 5,940,844 A | 8/1999 | Cahill et al. |
| 5,715,399 A | 2/1998 | Bezos | 5,943,656 A | 8/1999 | Crooks |
| 5,717,989 A | 2/1998 | Tozzoli et al. | 5,944,784 A | 8/1999 | Simonoff et al. |
| 5,724,424 A | 3/1998 | Gifford | 5,945,653 A | 8/1999 | Walker et al. |
| 5,724,593 A | 3/1998 | Hargrave, III et al. | 5,946,667 A | 8/1999 | Tull, Jr. et al. |
| 5,727,249 A | 3/1998 | Powell | 5,949,044 A | 9/1999 | Walker et al. |
| 5,748,780 A | 5/1998 | Stolfo | 5,950,174 A | 9/1999 | Brendzel |
| 5,751,842 A | 5/1998 | Eccles | 5,950,176 A | 9/1999 | Keiser et al. |
| 5,757,917 A | 5/1998 | Rose et al. | 5,956,700 A | 9/1999 | Landry |
| 5,770,843 A | 6/1998 | Rose et al. | 5,960,411 A | 9/1999 | Hartman et al. |
| 5,774,553 A | 6/1998 | Rosen | 5,963,659 A | 10/1999 | Cahill et al. |
| 5,778,157 A | 7/1998 | Oatman et al. | 5,963,925 A | 10/1999 | Kolling et al. |
| 5,783,808 A | 7/1998 | Josephson | 5,966,531 A | 10/1999 | Skeen et al. |
| 5,784,696 A | 7/1998 | Melnikof | 5,966,672 A | 10/1999 | Knupp |
| 5,787,402 A | 7/1998 | Potter et al. | 5,966,698 A | 10/1999 | Pollin |
| 5,787,403 A | 7/1998 | Randle | 5,970,469 A | 10/1999 | Scroggie et al. |
| 5,789,732 A | 8/1998 | McMahon et al. | 5,970,475 A | 10/1999 | Barnes et al. |
| 5,793,861 A | 8/1998 | Haigh | 5,970,479 A | 10/1999 | Shepherd |
| 5,794,221 A | 8/1998 | Egendorf | 5,978,780 A | 11/1999 | Watson |
| 5,796,827 A | 8/1998 | Coppersmith et al. | 5,986,673 A | 11/1999 | Martz |
| 5,802,498 A | 9/1998 | Comesanas | 5,987,434 A | 11/1999 | Libman |
| 5,802,499 A | 9/1998 | Sampson et al. | 5,987,435 A | 11/1999 | Weiss et al. |
| 5,806,047 A | 9/1998 | Hackel et al. | 5,987,436 A | 11/1999 | Halbrook |
| 5,806,048 A | 9/1998 | Kiron et al. | 5,987,439 A | 11/1999 | Gustin et al. |
| 5,819,236 A | 10/1998 | Josephson | 5,991,749 A | 11/1999 | Morrill |
| 5,819,238 A | 10/1998 | Fernholz | 5,991,750 A | 11/1999 | Craig |
| 5,819,273 A | 10/1998 | Vora et al. | 5,995,943 A | 11/1999 | Bull et al. |
| 5,826,241 A | 10/1998 | Stein | 6,000,832 A | 12/1999 | Franklin et al. |
| 5,826,245 A | 10/1998 | Sandberg-Diment | 6,002,767 A | 12/1999 | Kramer |
| 5,832,090 A | 11/1998 | Raspotnik | 6,003,762 A | 12/1999 | Hayashida |
| 5,832,447 A | 11/1998 | Rieker | 6,006,205 A | 12/1999 | Loeb et al. |
| 5,832,457 A | 11/1998 | O'Brien | 6,006,206 A | 12/1999 | Smith et al. |
| 5,832,460 A | 11/1998 | Bednar | 6,006,208 A | 12/1999 | Forst et al. |
| 5,832,461 A | 11/1998 | Leon et al. | 6,009,442 A | 12/1999 | Chen et al. |
| 5,832,463 A | 11/1998 | Houvener et al. | 6,012,046 A | 1/2000 | Lupien et al. |
| 5,832,464 A | 11/1998 | Houvener et al. | 6,014,634 A | 1/2000 | Scroggie et al. |
| 5,832,488 A | 11/1998 | Eberhardt | 6,014,636 A | 1/2000 | Reeder |
| 5,835,580 A | 11/1998 | Fraser | 6,016,482 A | 1/2000 | Molinari et al. |
| 5,835,603 A | 11/1998 | Coutts | 6,016,484 A | 1/2000 | Williams et al. |
| 5,835,899 A | 11/1998 | Rose et al. | 6,018,714 A | 1/2000 | Risen, Jr. |

| | | | | | | |
|---|---|---|---|---|---|---|
| 6,018,718 | A | 1/2000 | Walker et al. | 6,134,600 A | 10/2000 | Liu |
| 6,018,721 | A | 1/2000 | Aziz et al. | 6,138,118 A | 10/2000 | Koppstein et al. |
| 6,023,280 | A | 2/2000 | Becker et al. | 6,138,917 A | 10/2000 | Chapin, Jr. |
| 6,026,388 | A | 2/2000 | Liddy et al. | 6,141,666 A | 10/2000 | Tobin |
| 6,029,139 | A | 2/2000 | Cunningham et al. | 6,144,946 A | 11/2000 | Iwamura |
| 6,029,146 | A | 2/2000 | Hawkins et al. | 6,148,293 A | 11/2000 | King |
| 6,029,147 | A | 2/2000 | Horadan et al. | 6,148,298 A | 11/2000 | LaStrange et al. |
| 6,029,153 | A | 2/2000 | Bauchner et al. | 6,149,055 A | 11/2000 | Gatto |
| 6,032,133 | A | 2/2000 | Hilt et al. | 6,149,056 A | 11/2000 | Stinson et al. |
| 6,032,134 | A | 2/2000 | Weissman | 6,167,385 A | 12/2000 | Hartley-Urquhart |
| 6,032,136 | A | 2/2000 | Brake, Jr. et al. | 6,173,270 B1 | 1/2001 | Cristofich et al. |
| 6,032,137 | A | 2/2000 | Hallard | 6,173,272 B1 | 1/2001 | Thomas et al. |
| 6,035,281 | A | 3/2000 | Crosskey et al. | 6,173,276 B1 | 1/2001 | Kant et al. |
| 6,035,285 | A | 3/2000 | Schlect et al. | 6,178,420 B1 | 1/2001 | Sassano |
| 6,035,287 | A | 3/2000 | Stallaert et al. | 6,181,837 B1 | 1/2001 | Cahill et al. |
| 6,036,099 | A | 3/2000 | Leighton | 6,182,059 B1 | 1/2001 | Angotti et al. |
| 6,038,553 | A | 3/2000 | Hyde | 6,185,541 B1 | 2/2001 | Scroggie et al. |
| 6,041,312 | A | 3/2000 | Bickerton et al. | 6,185,542 B1 | 2/2001 | Moran et al. |
| 6,041,315 | A | 3/2000 | Pollin | 6,185,544 B1 | 2/2001 | Sakamoto et al. |
| 6,044,362 | A | 3/2000 | Neely | 6,185,567 B1 | 2/2001 | Ratnaraj et al. |
| 6,045,039 | A | 4/2000 | Stinson et al. | 6,188,309 B1 | 2/2001 | Levine |
| 6,047,261 | A | 4/2000 | Siefert | 6,195,647 B1 | 2/2001 | Martyn et al. |
| 6,048,271 | A | 4/2000 | Barcelou | 6,202,054 B1 | 3/2001 | Lawlor et al. |
| 6,049,783 | A | 4/2000 | Segal et al. | 6,205,433 B1 | 3/2001 | Boesch et al. |
| 6,052,673 | A | 4/2000 | Leon et al. | 6,213,391 B1 | 4/2001 | Lewis |
| 6,052,674 | A | 4/2000 | Zervides et al. | 6,223,168 B1 | 4/2001 | McGurl et al. |
| 6,055,522 | A | 4/2000 | Krishna et al. | 6,226,623 B1 | 5/2001 | Schein et al. |
| 6,058,378 | A | 5/2000 | Clark et al. | 6,227,447 B1 | 5/2001 | Campisano |
| 6,058,380 | A | 5/2000 | Anderson et al. | 6,233,565 B1 | 5/2001 | Lewis et al. |
| 6,058,381 | A | 5/2000 | Nelson | 6,233,566 B1 | 5/2001 | Levine et al. |
| 6,061,662 | A | 5/2000 | Makivic | 6,236,972 B1 | 5/2001 | Shkedy |
| 6,061,665 | A | 5/2000 | Bahreman | 6,236,977 B1 | 5/2001 | Verba et al. |
| 6,064,764 | A | 5/2000 | Bhaskaran et al. | 6,240,444 B1 | 5/2001 | Fin et al. |
| 6,064,984 | A | 5/2000 | Ferguson et al. | 6,243,670 B1 | 6/2001 | Bessho et al. |
| 6,064,987 | A | 5/2000 | Walker et al. | 6,243,689 B1 | 6/2001 | Norton |
| 6,065,675 | A | 5/2000 | Teicher | 6,260,021 B1 | 7/2001 | Wong et al. |
| 6,067,524 | A | 5/2000 | Byerly et al. | 6,263,321 B1 | 7/2001 | Daughtery, III |
| 6,070,150 | A | 5/2000 | Remington et al. | 6,263,335 B1 | 7/2001 | Paik et al. |
| 6,070,798 | A | 6/2000 | Nethery | 6,266,683 B1 | 7/2001 | Yehuda et al. |
| 6,073,104 | A | 6/2000 | Field | 6,267,292 B1 | 7/2001 | Walker et al. |
| 6,073,113 | A | 6/2000 | Guinan | 6,272,474 B1 | 8/2001 | Garcia |
| 6,073,115 | A | 6/2000 | Marshall | 6,275,229 B1 | 8/2001 | Weiner et al. |
| 6,076,072 | A | 6/2000 | Libman | 6,278,981 B1 | 8/2001 | Dembo et al. |
| 6,078,907 | A | 6/2000 | Lamm | 6,278,982 B1 | 8/2001 | Korhammer et al. |
| 6,078,914 | A | 6/2000 | Redfern | 6,278,996 B1 | 8/2001 | Richardson et al. |
| 6,078,956 | A | 6/2000 | Bryant et al. | 6,282,516 B1 | 8/2001 | Giullani |
| 6,081,774 | A | 6/2000 | de Hita et al. | 6,282,537 B1 | 8/2001 | Madnick et al. |
| 6,081,790 | A | 6/2000 | Rosen | 6,285,986 B1 | 9/2001 | Andrews |
| 6,085,168 | A | 7/2000 | Mori et al. | 6,285,989 B1 | 9/2001 | Shoham |
| 6,088,683 | A | 7/2000 | Jalili | 6,289,322 B1 | 9/2001 | Kitchen et al. |
| 6,088,685 | A | 7/2000 | Kiron et al. | 6,292,789 B1 | 9/2001 | Schutzer |
| 6,088,686 | A | 7/2000 | Walker et al. | 6,301,379 B1 | 10/2001 | Thompson et al. |
| 6,092,056 | A | 7/2000 | Tull, Jr. et al. | 6,301,567 B1 | 10/2001 | Leong et al. |
| 6,092,057 | A | 7/2000 | Zimmerman et al. | 6,304,858 B1 | 10/2001 | Mosler et al. |
| 6,098,053 | A | 8/2000 | Slater | 6,305,603 B1 | 10/2001 | Grunbok, Jr. et al. |
| 6,098,070 | A | 8/2000 | Maxwell | 6,308,887 B1 | 10/2001 | Korman et al. |
| 6,101,479 | A | 8/2000 | Shaw | 6,313,854 B1 | 11/2001 | Gibson |
| 6,105,005 | A | 8/2000 | Fuhrer | 6,317,726 B1 | 11/2001 | O'Shaughnessy |
| 6,105,007 | A | 8/2000 | Norris | 6,317,728 B1 | 11/2001 | Kane |
| 6,105,011 | A | 8/2000 | Morrison, Jr. | 6,321,212 B1 | 11/2001 | Lange |
| 6,108,639 | A | 8/2000 | Walker et al. | 6,323,881 B1 | 11/2001 | Broulik et al. |
| 6,108,641 | A | 8/2000 | Kenna et al. | 6,324,524 B1 | 11/2001 | Lent et al. |
| 6,110,044 | A | 8/2000 | Stern | 6,327,575 B1 | 12/2001 | Katz |
| 6,111,858 | A | 8/2000 | Greaves et al. | 6,332,163 B1 | 12/2001 | Bowman-Amuah |
| 6,115,690 | A | 9/2000 | Wong | 6,338,047 B1 | 1/2002 | Wallman |
| 6,119,106 | A | 9/2000 | Mersky et al. | 6,338,049 B1 | 1/2002 | Walker et al. |
| 6,119,107 | A | 9/2000 | Polk | 6,338,055 B1 | 1/2002 | Hagmann et al. |
| 6,125,354 | A | 9/2000 | Macfarlane et al. | 6,338,068 B1 | 1/2002 | Moore et al. |
| 6,128,599 | A | 10/2000 | Walker et al. | 6,341,724 B2 | 1/2002 | Campisano |
| 6,128,602 | A | 10/2000 | Northington et al. | 6,343,279 B1 | 1/2002 | Bissonette et al. |
| 6,128,603 | A | 10/2000 | Dent et al. | 6,343,287 B1 | 1/2002 | Kumar et al. |
| 6,129,273 | A | 10/2000 | Shah | 6,344,108 B1 | 2/2002 | Von Medvey et al. |
| 6,131,082 | A | 10/2000 | Hargrave, III et al. | 6,347,307 B1 | 2/2002 | Sandhu et al. |

| | | |
|---|---|---|
| 6,349,290 B1 | 2/2002 | Horowitz et al. |
| 6,349,291 B1 | 2/2002 | Varma |
| 6,349,972 B1 | 2/2002 | Geiger et al. |
| 6,351,735 B1 | 2/2002 | Deaton et al. |
| 6,356,933 B2 | 3/2002 | Mitchell et al. |
| 6,360,210 B1 | 3/2002 | Wallman |
| 6,363,164 B1 | 3/2002 | Jones et al. |
| 6,363,364 B1 | 3/2002 | Nel |
| 6,363,365 B1 | 3/2002 | Kou |
| 6,366,908 B1 | 4/2002 | Chong et al. |
| 6,366,967 B1 | 4/2002 | Wagner |
| 6,374,235 B1 | 4/2002 | Chen et al. |
| 6,377,935 B1 | 4/2002 | Deaton et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,390,362 B1 | 5/2002 | Martin |
| 6,393,409 B2 | 5/2002 | Young et al. |
| 6,401,080 B1 | 6/2002 | Bigus et al. |
| 6,405,173 B1 | 6/2002 | Honarvar et al. |
| 6,405,181 B2 | 6/2002 | Lent et al. |
| 6,408,282 B1 | 6/2002 | Buist |
| 6,409,593 B1 | 6/2002 | Petrecca |
| 6,411,947 B1 | 6/2002 | Rice et al. |
| 6,415,259 B1 | 7/2002 | Wolfinger et al. |
| 6,418,417 B1 | 7/2002 | Corby et al. |
| 6,418,419 B1 | 7/2002 | Nieboer et al. |
| 6,418,420 B1 | 7/2002 | Digiorgio et al. |
| 6,418,430 B1 | 7/2002 | Defazio et al. |
| 6,421,653 B1 | 7/2002 | May |
| 6,424,949 B1 | 7/2002 | Deaton et al. |
| 6,424,980 B1 | 7/2002 | Iizuka et al. |
| 6,429,868 B1 | 8/2002 | Dehner, Jr. et al. |
| 6,434,159 B1 | 8/2002 | Woodward et al. |
| 6,442,545 B1 | 8/2002 | Feldman et al. |
| 6,446,072 B1 | 9/2002 | Schulze et al. |
| 6,446,110 B1 | 9/2002 | Lection et al. |
| 6,454,647 B1 | 9/2002 | Woodbury |
| 6,456,981 B1 | 9/2002 | Dejaeger et al. |
| 6,457,066 B1 | 9/2002 | Mein et al. |
| 6,460,020 B1 | 10/2002 | Pool et al. |
| 6,480,882 B1 | 11/2002 | McAdam et al. |
| 6,485,922 B1 | 11/2002 | Erickson et al. |
| 6,489,954 B1 | 12/2002 | Powlette |
| 6,490,568 B1 | 12/2002 | Omara et al. |
| 6,490,584 B2 | 12/2002 | Barrett et al. |
| 6,493,681 B1 | 12/2002 | Tertitski et al. |
| 6,493,685 B1 | 12/2002 | Ensel et al. |
| 6,510,406 B1 | 1/2003 | Marchisio |
| 6,513,019 B2 | 1/2003 | Lewis |
| 6,516,303 B1 | 2/2003 | Wallman |
| 6,516,308 B1 | 2/2003 | Cohen |
| 6,523,022 B1 | 2/2003 | Hobbs |
| 6,535,896 B2 | 3/2003 | Britton et al. |
| 6,536,663 B1 | 3/2003 | Lozier et al. |
| 6,554,185 B1 | 4/2003 | Montross et al. |
| 6,556,987 B1 | 4/2003 | Brown et al. |
| 6,560,581 B1 | 5/2003 | Fox et al. |
| 6,564,250 B1 | 5/2003 | Nguyen |
| 6,567,791 B2 | 5/2003 | Lent et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,607,127 B2 | 8/2003 | Wong |
| 6,609,113 B1 | 8/2003 | O'Leary et al. |
| 6,609,125 B1 | 8/2003 | Layne et al. |
| 6,611,825 B1 | 8/2003 | Billheimer et al. |
| 6,615,187 B1 | 9/2003 | Ashenmil et al. |
| 6,629,081 B1 | 9/2003 | Cornelius et al. |
| 6,629,097 B1 | 9/2003 | Keith |
| 6,631,373 B1 | 10/2003 | Otani et al. |
| 6,633,868 B1 | 10/2003 | Min et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | Mcneal |
| D490,840 S | 6/2004 | Arakaki et al. |
| D491,186 S | 6/2004 | Arakaki et al. |
| D491,953 S | 6/2004 | Arakaki et al. |
| D496,365 S | 9/2004 | Liu et al. |
| D498,236 S | 11/2004 | Liu et al. |
| 6,820,058 B2 | 11/2004 | Wood et al. |
| 6,824,066 B2 | 11/2004 | Weyant |
| 6,825,940 B1 | 11/2004 | Wu et al. |
| 6,856,973 B1 | 2/2005 | Bott |
| 6,860,375 B2 | 3/2005 | Hallowell et al. |
| 6,865,547 B1 | 3/2005 | Brake, Jr. et al. |
| 6,885,994 B1 | 4/2005 | Scroggie et al. |
| 6,886,046 B2 | 4/2005 | Stutz et al. |
| 6,892,187 B2 | 5/2005 | Phillips et al. |
| 6,912,502 B1 | 6/2005 | Buddle et al. |
| 6,942,569 B2 | 9/2005 | Petracca |
| 6,945,453 B1 | 9/2005 | Schwarz |
| 6,954,896 B1 | 10/2005 | Dodrill et al. |
| 6,961,710 B1 | 11/2005 | Yanagisawa et al. |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,938 B1 | 2/2006 | Libman |
| 6,999,943 B1 | 2/2006 | Johnson et al. |
| 7,004,382 B2 | 2/2006 | Sandru |
| 7,014,110 B2 | 3/2006 | Minowa et al. |
| 7,024,374 B1 | 4/2006 | Day et al. |
| 7,025,256 B1 | 4/2006 | Drummond et al. |
| 7,039,600 B1 | 5/2006 | Meek et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,159,116 B2 | 1/2007 | Moskowitz |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,266,511 B2 | 9/2007 | Teshima |
| 7,277,870 B2 | 10/2007 | Mourad et al. |
| 7,287,009 B1 | 10/2007 | Liebermann |
| 7,312,707 B1 | 12/2007 | Bishop et al. |
| 7,313,543 B1 | 12/2007 | Crane et al. |
| 7,317,823 B1 | 1/2008 | Price et al. |
| 7,328,211 B2 | 2/2008 | Bordner et al. |
| 7,337,148 B2 | 2/2008 | Xie et al. |
| 7,340,433 B1 | 3/2008 | Kay et al. |
| 7,349,884 B1 | 3/2008 | Odom |
| RE40,220 E | 4/2008 | Nichols et al. |
| 7,366,698 B1 | 4/2008 | Loy |
| 7,380,707 B1 | 6/2008 | Fredman |
| 7,401,048 B2 | 7/2008 | ROSEDALE et al. |
| 7,493,288 B2 | 2/2009 | Biship et al. |
| 7,536,354 B1 | 5/2009 | DeGroeve et al. |
| 7,546,272 B2 | 6/2009 | Loy |
| 7,587,363 B2 | 9/2009 | Cataline et al. |
| 2001/0011222 A1 | 8/2001 | Mclauchlin et al. |

| | | |
|---|---|---|
| 2001/0011241 A1 | 8/2001 | Nemzow |
| 2001/0011242 A1 | 8/2001 | Allex et al. |
| 2001/0018666 A1 | 8/2001 | Sugiyama et al. |
| 2001/0018739 A1 | 8/2001 | Anderson et al. |
| 2001/0023415 A1 | 9/2001 | Keil |
| 2001/0025264 A1 | 9/2001 | Deaddio et al. |
| 2001/0027441 A1 | 10/2001 | Wankmueller |
| 2001/0032139 A1 | 10/2001 | Debonnett, Jr. |
| 2001/0032217 A1 | 10/2001 | Huang |
| 2001/0034663 A1 | 10/2001 | Teveler et al. |
| 2001/0037300 A1 | 11/2001 | Miyazaki et al. |
| 2001/0037309 A1 | 11/2001 | Vrain |
| 2001/0038033 A1 | 11/2001 | Habib |
| 2001/0042034 A1 | 11/2001 | Elliott |
| 2001/0043235 A1 | 11/2001 | Best et al. |
| 2001/0044771 A1 | 11/2001 | Usher et al. |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0012445 A1 | 1/2002 | Perry |
| 2002/0013728 A1 | 1/2002 | Wilkman |
| 2002/0013753 A1 | 1/2002 | Marks de Chabris et al. |
| 2002/0013862 A1 | 1/2002 | Orchard et al. |
| 2002/0016762 A1 | 2/2002 | Feilbogen et al. |
| 2002/0016819 A1 | 2/2002 | Sugimoto et al. |
| 2002/0018077 A1 | 2/2002 | Powlette |
| 2002/0022956 A1 | 2/2002 | Ukraincsky et al. |
| 2002/0023053 A1 | 2/2002 | Szoc et al. |
| 2002/0023055 A1 | 2/2002 | Antognini et al. |
| 2002/0026394 A1 | 2/2002 | Savage et al. |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0032644 A1 | 3/2002 | Corby et al. |
| 2002/0032651 A1 | 3/2002 | Embrey |
| 2002/0035561 A1 | 3/2002 | Archer et al. |
| 2002/0038363 A1 | 3/2002 | Maclean |
| 2002/0042767 A1 | 4/2002 | Kwan |
| 2002/0046169 A1 | 4/2002 | Keresman, III et al. |
| 2002/0047316 A1 | 4/2002 | Chitayat |
| 2002/0049666 A1 | 4/2002 | Reuter et al. |
| 2002/0052842 A1 | 5/2002 | Schuba et al. |
| 2002/0054115 A1 | 5/2002 | Mack et al. |
| 2002/0055907 A1 | 5/2002 | Pater et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069134 A1 | 6/2002 | Solomon |
| 2002/0069157 A1 | 6/2002 | Jordan |
| 2002/0072976 A1 | 6/2002 | Virtanen et al. |
| 2002/0073007 A1 | 6/2002 | Ayache |
| 2002/0077978 A1 | 6/2002 | O'Leary et al. |
| 2002/0078253 A1 | 6/2002 | Szondy et al. |
| 2002/0082985 A1 | 6/2002 | MacKay |
| 2002/0084321 A1 | 7/2002 | Martens et al. |
| 2002/0087373 A1 | 7/2002 | Dickstein et al. |
| 2002/0087415 A1 | 7/2002 | Allen et al. |
| 2002/0087454 A1 | 7/2002 | Calo et al. |
| 2002/0087455 A1 | 7/2002 | Tsagarakis et al. |
| 2002/0087457 A1 | 7/2002 | Madeley et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0099586 A1 | 7/2002 | Bladen et al. |
| 2002/0099646 A1 | 7/2002 | Agarwal et al. |
| 2002/0099656 A1 | 7/2002 | Poh Wong |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0112056 A1 | 8/2002 | Baldwin et al. |
| 2002/0123947 A1 | 9/2002 | Yuste et al. |
| 2002/0128981 A1 | 9/2002 | Kawan et al. |
| 2002/0129221 A1 | 9/2002 | Borgin et al. |
| 2002/0130868 A1 | 9/2002 | Smith |
| 2002/0133461 A1 | 9/2002 | Ramachandran |
| 2002/0138390 A1* | 9/2002 | May ........................... 705/37 |
| 2002/0138398 A1 | 9/2002 | Kalin et al. |
| 2002/0145039 A1 | 10/2002 | Carroll |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0156658 A1 | 10/2002 | Selesny et al. |
| 2002/0156723 A1 | 10/2002 | Lilly et al. |
| 2002/0161692 A1 | 10/2002 | Loh et al. |
| 2002/0161853 A1 | 10/2002 | Burak et al. |
| 2002/0169658 A1 | 11/2002 | Adler |
| 2002/0169707 A1 | 11/2002 | Koek et al. |
| 2002/0170966 A1 | 11/2002 | Hannigan et al. |
| 2002/0174043 A1 | 11/2002 | Gilbert et al. |
| 2002/0178071 A1 | 11/2002 | Walker et al. |
| 2002/0178096 A1 | 11/2002 | Marshall |
| 2002/0184132 A1 | 12/2002 | Foster |
| 2002/0184151 A1 | 12/2002 | Maloney |
| 2002/0184237 A1 | 12/2002 | McFeely |
| 2002/0194081 A1 | 12/2002 | Perkowski |
| 2002/0194096 A1 | 12/2002 | Falcone et al. |
| 2002/0194097 A1 | 12/2002 | Reitz |
| 2002/0194114 A1 | 12/2002 | Erdmier |
| 2002/0198817 A1 | 12/2002 | Dhir |
| 2002/0199182 A1 | 12/2002 | Whitehead |
| 2003/0004942 A1 | 1/2003 | Bird |
| 2003/0009411 A1 | 1/2003 | Ram et al. |
| 2003/0018557 A1 | 1/2003 | Gilbert et al. |
| 2003/0018567 A1 | 1/2003 | Flitcroft et al. |
| 2003/0018714 A1 | 1/2003 | Mikhailov et al. |
| 2003/0028481 A1 | 2/2003 | Flitcroft et al. |
| 2003/0033212 A1 | 2/2003 | Sandhu et al. |
| 2003/0037002 A1 | 2/2003 | Higgins et al. |
| 2003/0037174 A1 | 2/2003 | Lavin et al. |
| 2003/0040927 A1 | 2/2003 | Sato et al. |
| 2003/0040959 A1 | 2/2003 | Fei et al. |
| 2003/0046218 A1 | 3/2003 | Albanese et al. |
| 2003/0055675 A1 | 3/2003 | Klein |
| 2003/0065594 A1 | 4/2003 | Murphy |
| 2003/0065805 A1 | 4/2003 | Barnes |
| 2003/0066025 A1 | 4/2003 | Garner et al. |
| 2003/0066032 A1 | 4/2003 | Ramachandran et al. |
| 2003/0069780 A1 | 4/2003 | Hailwood et al. |
| 2003/0078869 A1 | 4/2003 | Williams |
| 2003/0088496 A1 | 5/2003 | Piotrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0097335 A1 | 5/2003 | Moskowitz et al. |
| 2003/0100803 A1 | 5/2003 | Lu et al. |
| 2003/0105641 A1 | 6/2003 | Lewis |
| 2003/0105981 A1 | 6/2003 | Miller et al. |
| 2003/0110070 A1 | 6/2003 | De |
| 2003/0110136 A1 | 6/2003 | Wells et al. |
| 2003/0110442 A1 | 6/2003 | Battle |
| 2003/0115122 A1 | 6/2003 | Slater et al. |
| 2003/0120686 A1 | 6/2003 | Kim et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0130919 A1 | 7/2003 | Templeton et al. |
| 2003/0130945 A1 | 7/2003 | Force et al. |
| 2003/0130952 A1 | 7/2003 | Bell et al. |
| 2003/0140035 A1 | 7/2003 | Burrows |

| | | |
|---|---|---|
| 2003/0144942 A1 | 7/2003 | Sobek |
| 2003/0149653 A1 | 8/2003 | Penney |
| 2003/0154071 A1 | 8/2003 | Shreve |
| 2003/0158949 A1 | 8/2003 | Miller et al. |
| 2003/0187787 A1 | 10/2003 | Freund |
| 2003/0187789 A1 | 10/2003 | Karas et al. |
| 2003/0188255 A1 | 10/2003 | Shimizu et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0213843 A1 | 11/2003 | Jackson |
| 2003/0217005 A1 | 11/2003 | Drummond et al. |
| 2003/0217329 A1 | 11/2003 | Good |
| 2003/0218066 A1 | 11/2003 | Fernandes et al. |
| 2003/0220861 A1 | 11/2003 | Broms et al. |
| 2003/0220863 A1 | 11/2003 | Holm et al. |
| 2003/0220868 A1 | 11/2003 | May |
| 2003/0225663 A1 | 12/2003 | Horan et al. |
| 2003/0229525 A1 | 12/2003 | Callahan et al. |
| 2003/0233305 A1 | 12/2003 | Solomon |
| 2003/0233459 A1 | 12/2003 | Miller et al. |
| 2003/0236747 A1 | 12/2003 | Sager |
| 2003/0236862 A1 | 12/2003 | Miller et al. |
| 2003/0236957 A1 | 12/2003 | Miller et al. |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |
| 2004/0039691 A1 | 2/2004 | Barratt et al. |
| 2004/0049451 A1 | 3/2004 | Berardi et al. |
| 2004/0049456 A1 | 3/2004 | Dreyer |
| 2004/0064397 A1 | 4/2004 | Lynn et al. |
| 2004/0064409 A1 | 4/2004 | Kight et al. |
| 2004/0078248 A1 | 4/2004 | Altschuler |
| 2004/0078328 A1 | 4/2004 | Talbert et al. |
| 2004/0088245 A1 | 5/2004 | Narayan et al. |
| 2004/0094624 A1 | 5/2004 | Fernandes et al. |
| 2004/0103003 A1 | 5/2004 | Mayers et al. |
| 2004/0133516 A1 | 7/2004 | Buchanan et al. |
| 2004/0148247 A1 | 7/2004 | Miller et al. |
| 2004/0149544 A1 | 8/2004 | Dal Ferro |
| 2004/0159700 A1 | 8/2004 | Khan et al. |
| 2004/0162775 A1 | 8/2004 | Winklevoss et al. |
| 2004/0201735 A1 | 10/2004 | Baron |
| 2004/0210498 A1 | 10/2004 | Freund |
| 2004/0228514 A1 | 11/2004 | Houle et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0242308 A1 | 12/2004 | Gray |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0021466 A1 | 1/2005 | Buchanan et al. |
| 2005/0033619 A1 | 2/2005 | Barnes et al. |
| 2005/0033690 A1 | 2/2005 | Antognini et al. |
| 2005/0035847 A1 | 2/2005 | Bonalle et al. |
| 2005/0040242 A1 | 2/2005 | Beenau et al. |
| 2005/0055254 A1* | 3/2005 | Schmidtberg et al. .......... 705/7 |
| 2005/0060256 A1 | 3/2005 | Peterson et al. |
| 2005/0077349 A1 | 4/2005 | Bonalle et al. |
| 2005/0086170 A1 | 4/2005 | Rao |
| 2005/0086178 A1 | 4/2005 | Xie et al. |
| 2005/0091156 A1 | 4/2005 | Hailwood et al. |
| 2005/0097046 A1 | 5/2005 | Singfield |
| 2005/0097050 A1 | 5/2005 | Orcutt |
| 2005/0114883 A1 | 5/2005 | Nagai et al. |
| 2005/0116024 A1 | 6/2005 | Beenau et al. |
| 2005/0144059 A1 | 6/2005 | Schuessler |
| 2005/0167488 A1 | 8/2005 | Higgins et al. |
| 2005/0171898 A1 | 8/2005 | Bishop et al. |
| 2005/0177480 A1 | 8/2005 | Huang |
| 2005/0177483 A1 | 8/2005 | Napier et al. |
| 2005/0179251 A1 | 8/2005 | Wagoner et al. |
| 2005/0189427 A1 | 9/2005 | Brown et al. |
| 2005/0209954 A1 | 9/2005 | Asher et al. |
| 2005/0216888 A1 | 9/2005 | Drummond et al. |
| 2005/0228751 A1 | 10/2005 | Keown et al. |
| 2005/0261955 A1 | 11/2005 | Humble et al. |
| 2005/0283437 A1 | 12/2005 | Mcrae et al. |
| 2005/0289051 A1 | 12/2005 | Allin et al. |
| 2006/0036553 A1 | 2/2006 | Gupta et al. |
| 2006/0039733 A1 | 2/2006 | Meyerhofer |
| 2006/0041540 A1 | 2/2006 | Shannon et al. |
| 2006/0095358 A1 | 5/2006 | Viarengo et al. |
| 2006/0095374 A1 | 5/2006 | Lo et al. |
| 2006/0106650 A1 | 5/2006 | Huang |
| 2006/0106717 A1 | 5/2006 | Randle et al. |
| 2006/0136335 A1 | 6/2006 | Ferguson |
| 2006/0155554 A1* | 7/2006 | Mo .............................. 705/1 |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0259390 A1 | 11/2006 | Rosenberger |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0061260 A1 | 3/2007 | DeGroeve et al. |
| 2007/0138255 A1 | 6/2007 | Carreon et al. |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0116283 A1 | 5/2008 | Newbrough et al. |
| 2008/0133522 A1 | 6/2008 | Bordner et al. |
| 2008/0193008 A1 | 8/2008 | Mount et al. |
| 2009/0043651 A1 | 2/2009 | Schwarz |
| 2009/0150370 A1 | 6/2009 | Christensen et al. |

FOREIGN PATENT DOCUMENTS

| | | |
|---|---|---|
| EP | 421808 | 4/1991 |
| EP | 0665486 | 8/1995 |
| EP | 1014318 | 6/2000 |
| JP | 2001-266039 | 9/2001 |
| JP | 2002-24618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| WO | WO 91-16691 | 10/1991 |
| WO | WO 93-08545 | 4/1993 |
| WO | WO 94-28497 | 12/1994 |
| WO | WO 96-08783 | 3/1996 |
| WO | WO 96-12242 A1 | 4/1996 |
| WO | WO 97-14108 | 4/1997 |
| WO | WO 97-45796 | 12/1997 |
| WO | WO 97-45814 | 12/1997 |
| WO | WO 98-09260 | 3/1998 |
| WO | WO 98/43170 | 10/1998 |
| WO | WO 99-10823 | 3/1999 |
| WO | WO 00-39979 | 7/2000 |
| WO | WO 01/20530 | 3/2001 |
| WO | WO 01/37540 | 5/2001 |
| WO | WO 01/57716 | 8/2001 |
| WO | WO 01/59670 | 8/2001 |
| WO | WO 01-75730 | 10/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02-063432 | 8/2002 |
| WO | WO 02/063516 | 8/2002 |
| WO | WO 02/065278 | 8/2002 |

| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |
| WO | WO 2004-079603 | 9/2004 |

OTHER PUBLICATIONS

Silverman, A new strategy for giving away your money, Wall Street Journal, D1, Oct. 6, 2004.
Czejdo, Automatic generation ontology based anntations in XML and their use in retrieval systems, Web Information Systems Engineering, 2000, Proceedings of the First International Conference, Jun. 19, 2000, p. 296.
Novell, Inc., Beginning of Viewing Information and Viewing Basic Information about a print job.
Block Trades Market Practice, Apr. 1, 2003, pp. 1-10.
Chacko, Cephalon, Inc. Taking Risk Management Gherory Seriously.
Kus, Contingent capital: just in the capital management sets a new standard; Sponsored statement.
Electronic Trading Tools.
Martin, Email Report, Issue 11, Aug. 16, 2001, printed Aug. 2, 2005.
Fast Email Extractor 4.4.
Form 10-K, United States Securities and Exchange Commission, no date,year ending Dec. 31, 2003.
PILA, In Case of Emergency; contingent capital.
Intellseek and Inxight Partner to Provide New Business Intelligence Solutions, www.inxight.com/news/021029$_{13}$ intelliseek.html, Oct. 29, 2002.
Unknown, Investigating Systems.
May, Modeling and Querying Structure and Contents of the Web, 10th International Workshop on Database & Amp; Expert Systems Applications, Sep. 1, 1999, p. 721.
Rupali et al., Phrase-based Text Representation for Managing the Web Documents.
Lam et al., Querying Web Data—The WebQA Approach.
Rising to the challenge of global STP, Euromoney Publications PLC Global Inventor, Nov. 1, 1999, pp. 51-52; Issn. 0951-3604.
STP in the Bond Market?, Wall Street & Technology, Dec. 1, 2002, p. 20.
Ericson, Softwerc releases patent-pending.
IBM Corp., Strict Read Order Control for a Queing System.
Carchiolo et al., Structuring the Web.
Witten et al., Text Mining: A New Frontier for Lossless Compression.
Fan et al., The Internet and Future Financial Markets; Industry Trend or Event, Association for Computing Machinery, Inc., Sec. 11, vol. 43; Nov. 1, 2000, p. 82; Issn: 0001-0782.
Emery, et al., The Measurement of Liquidity, Journal of Accounting Research, vol. 20, No. 2, Part 1, p. 290-303, Autumn 1982.
Calado, The Web-DL Environment for Building Digital Libraries from the Web.
Ribiero-Neto et al., Top Down Extraction of Semi-Structured Data, String Processing and Information Retrieval Symposium & amp.
Roberts, Top Priority on Bottom Line: More Companies Seeting to Manage Business Risks.
TradeWeb's STP vision, Euromoney Institutional Investor PLC, Sec. 406, vol. 34, Feb. 1, 2003, p. S6; Issn: 0014-2433.
Elkayam, Using Indexed Bonds.
Myllymaki, With Standard XML Technologies.
Hewlett-Packard, x4queview.org.
International Search Report of PCT/US05/38595.
International Search Report of PCT/US07/09522.
European Search Report dated Jul. 15, 2009 from corresponding EP Application No. 05820208.6.
Andersen Consulting Image-based transaction processing The banking industry's challenge for the 1990s and beyond 1989 acs01039270.
Annual Report Pursuant to Section 13 or 15(d) of The Securities Exchange Act of 1934 Form 10-K Intelidata Technologies Corporation Fiscal Year Ended Dec. 31, 2001.

Anonymous, PNC Bank Adds Chicago to National Lockbox Network Nov. 5, 1997.
Anonymous Chase Manhattan introduces new FEDI payables product ProQuest document ID 7806951 ISSN-ISBN 02686635, May 1995.
Anonymous Chase offers image lockbox for Europe Aug. 1997 acs01039336.
Anonymous Chasing the global trend Cash Management News ProQuest document ID 9319923 ISSN-ISBN 02686635, Dec. 1995.
Anonymous Operating in a multi-currency environment ProQuest document ID 9215937 ISSN-ISBN 09589309, Oct. 1995.
Anonymous Systems spell change for foreign exchange Global Investor ProQuest document ID 1056152B ISSN-ISBN 09513604, Nov. 1996.
Anonymous Visa & Carnegie Mellon Plan Online Payment Scheme Newsbyte News Network Feb. 15, 1995.
Arend Mark Bank applications fuel optical storage market ABA Banking Journal Oct. 1991 acs01039000.
Armstrong Douglas Norwest eases difficulty of Interstate banking Bank's customers may use the same account number at any branch Oct. 12, 1995.
Bills Chase Pact Done What's Next for Web Vendors? The American Banker Technology Section Jun. 3, 2002 p. 23.
Block Valerie Blockbuster running test of a stored value card The American Banker Sep. 1, 1995.
Blockbuster running test of a stored value card The American Banker Sep. 1, 1995.
Buckley JP et al. Processing Noisy Structured Textual Data Using a Fuzzy Matching Approach Application to Postal Address Errors XP-001132075 pp. 195-205 (11 pages) Dec. 2000.
Business Wire IA Corp. wins contract with Comerica to install the first digital all items archive one of nation's top 25 bank holding companies expects to streamline operations. . . Jan. 9, 1997 acs01039033.
Business Wire IA Corp. shows complex transaction processing software Work vision at AIIM plus Check Vision and Remit Vision application frameworks for new advanced banking services. . . Apr. 14, 1997 acs01039025.
Business Wire Shawnut bank provides lockbox customers real-time on-line electronic exception processing 1A Corp's image-based lockbox system cuts processing time from days to minutes. . . Jan. 9, 1996 acs01039031.
Card Flash Daily Payment Card News www.cardweb.com printed Sep. 23, 2004.
Carreker Electronic check presentment Capturing new technology http—proquest.umi.com Banking Management Rolling Meadows vol. 71 Issue 2 Mar.-Apr. 1995 p. 32 5 pages.
CES-NaBANCO introduces stored value card technology blockbuster video is first merchant partner Business Wire Inc. Jan. 15, 1996.
Decovny Net Scope Banking Technology May 1997.
Dialog file 20 #10279554; Offer: Book Yourself Free Cassettes; Mar. 25, 2000; Birmingham Post p. 16.
Du Pont's Electronic Payments Corporate EFT Report v9 n1 Dialog file 636 Accession No. 01066902 Jan. 11, 1989.
Fidelity Helps Fund Sellers Trim the Taxes They'll Owe The Wall Street Journal Nov. 7, 2002.
Financial News Wells Fargo Rolls Out Nationwide Lockbox Check Conversion PR Newswire Association Apr. 22, 2003.
First Data markets stored-value cards, Cards International Jan. 30, 1996 p. 5.
Fitch Thomas P. Image technology brings lockbox breakthroughs Sep. 1995 acs01039344.
French Tech Stocks: Market Movers Investors Worry CheckFree Being Chased from Its Own Game http:—www.thestreet.com Jun. 20, 2002.
Friis M. William Goodbye to paper? ABA Banking Journal Mar. 1989, acs01037874.
Gluck Creating a Global Cash-Management Game Plan Bank Systems & Technology Feb. 1997 p. 28.
Goode On Profit Loss and the Mysteries of the Mind The New York Times Nov. 5, 2002.

Harsh Truth: Your Investments Likely Won't Make Any Money, date unknown.
Hunt Robert M. An Introduction to the Economics of Payment Card Networks Jun. 2003.
IEM Product Description ACS01066106, date unknown.
Jensen Cindy U.S. bank effectively manages complexity acs01039398 May 2006.
Jensen Cindy U.S. bank effectively manages complexity acs01039400 May 2006.
Jensen Cindy U.S. Bank effectively manages complexity May-Jun. 2006 acs01039402.
Keeton Ann Bank of America completes its rollout of 'paperless' processing of payments Nov. 1, 1999 acs01039334.
Lamond Credit Card Transactions Real World and Online Paying by Credit Card-Real World and Online http:—www.virtualschool.edu-mon-ElectronicProperty-klamond-credit printed Jul. 8, 2005, 17 pages.
Lamond Keith Credit Card Transactions Real World and Online http—www.virtualschool.edu-mon-ElectronicProperty-klamond-credit_card.htm pp. 1-17 printed Jul. 8, 2005.
Lupo Lisa Selkin Chase image-enables NY wholesale lockbox facility with VICOR technology Aug. 31, 1999 acs01039406.
Maher and Troutman Payor's Prescription for Painless Migration to Electronic Healthcare Payments and Remittance Advices PNC Bank Dec. 2001.
Maher and Troutman Provider's Prescription for Painless Migration to Receipt of Electronic Healthcare Payments and Remittance Advices PNC Bank Dec. 2001.
Malhotra Clearing House Enumerates e-Payments Ills The American Banker vol. 167 No. 154 Aug. 23, 2002.
Malykhina Elena Cell Phone Software Formats Checks For Online Banking InformationWeek Jan. 24, 2008.
Marjanovic Corporate Services: Chase Gears Up Global Payments System Series: 16 The American Banker vol. 160 Issue 174 Sep. 11, 1995 p. 41.
Marjanovic Steven NationsBank offers Lockbox Imaging Jul. 3, 1995 acs01039350.
Maturi Richard Personal Finance When you Need to Send Cash in a Flash, Sep. 25, 1988.
Matyas Stephen M. Digital Signatures - An Overview pp. 87 - 94 (1979).
McDonald The Stars in the Sky Flicker and Fund Stars Do the Same The Wall Street Journal, Jan. 15, 2003.
Mead Wendy S. Two Banks' Imaging Deals Target Fee Revenue Increases The American Banker May 9, 1997 acs01039019.
Money Initial Launch to 200 Credit Unions USA Today.com Jun. 27, 2002.
Moyer Liz Bank of Montreal to Install Imaging System by Unisys for Retail Lockbox Services The American Banker, Oct. 22, 1996, acs01039023.
Moyer Liz Key Corp joins trend to check imaging for lockbox The American Banker, Aug. 23, 1996 acs01039004.
Nokia Announces the World's First NFC Enabled Mobile Product for Contactless Payment and Ticketing PRNewswire, Feb. 9, 2005.
Norris First data unit develops blockbuster cash card Omaha World Hearld Sunrise Edition Business Section, Jan. 19, 1996, p. 16.
Press Release Mar. 5, 2004 Payment Data Systems Files Patent on Debit Card Payment Solution American City Business Journals Inc. Mar. 5, 2004.
Price Joanne et al. U.S. Appl. No. 60/133,577, May 11, 1999.
Reinbach Chase steps up treasury system ProQuest documednt ID 8723558 ISSN-ISBN: 10459472 Nov. 1995.
Schutzer Daniel Get ready for electronic commerce ABA Banking Journal Jun. 1995 acs01038994.
Shannon John New lockbox platform due out at NationsBank Feb. 1998 acs01039384.
Stanley Susan et al. Bank of America provides nationwide image lockbox services, Oct. 20, 1999, acs01039405.
Tauhert Christy Lock box solutions reengineer payments, Aug. 1996, acs01039337.
Technology In Brief Wachovia-InteliData Deal May 7, 2002.
Terrie Miller and Henry Yan When Custody Governs Benefits Canada Toronto, Feb. 1998, vol. 22 Issue 2 p. 33 5 pages.
Unknown ABA Banking Journal The front end and back end functions of item processing will benefit from the technological advances of imaging, Mar. 1990, acs01038997.
Unknown Alabama department of revenue selects Unisys for Imaging Solution to Speed tax Returns Save Taxpayers Money, Sep. 6, 1995 acs01039064.
Unknown BancTec selects alchemy CD-Based archival solution for remittance processing system May 6, 1998, acs01039047.
Unknown Business Wire State of Minnesota using AT&T imaging solution. . . Apr. 18, 1994, acs01039027.
Unknown Caere introduces the Model 1800 document remittance processor compact unit provides cost effective means for low to medium speed document processing Oct. 19, 1995, acs01039057.
Unknown Crestar to introduce new advanced cash management system based on IA Corp. software New system will be industry's first . . . Oct. 28, 1996 acs01039059.
Unknown DMP and IMR Partner to develop electronic archiving solution for wholesale Lockboxes and remittance processing Mar. 24, 1998 acs01039040.
Unknown IA announces installation at QuestPoint of first client-server cash management system with check image storage compatible with IBM NCR and Unisys May 29, 1997 acs01039044.
Unknown IA Corp. announces new CheckVision products new CheckVision archive software supports short Apr. 1, 1996 acs01039339.
Unknown IA Corporation becomes a major player in image-based cash management solutions Nov. 24, 1995 acs01039052.
Unknown IA presents new advanced cash management software at TMA to link banks and their corporate customers full suite of cash management products allow banks to offer treasury . . . Nov. 18, 1996 acs01039049.
Unknown IA's remit vision adopted by Harris Bank for CD-ROM and online customer viewing of check and remittance documents continues banking industry trends to use image-based processing as strategic weapon . . . May 28, 1996 acs01039042.
Unknown NationsBank rolls out first wholesale lockbox imaging Aug. 3, 1995 acs01039351.
Unknown NCR introduces 7780 item processing system image-based system scans and reads documents Mar. 11, 1992 acs01039038.
Unknown, Opening the Mail - Simultaneous Image Capture BN New Solutions Bank News Oct. 1996 ACS01066104.
Unknown Unknown Chapter Reports Texas Chapter Apr. 1998 ACS01066110.
Unknown Unknown Wassau Financial Systems' ImageRPS and OPEX interface a perfect math Dec. 1997, acs01066108.
Unknown Wholesale lockbox imaging Feb. 1, 1993 acs01039331.
Zuckerman The Hedge-Fund Craze The Wall Street Journal Jun. 12, 2002.

* cited by examiner

SYSTEM AND METHOD FOR ENHANCING SUPPLY CHAIN TRANSACTIONS

RELATED APPLICATIONS

This patent application is a continuation-in-part of co-pending utility patent application entitled "System And Method For Supply Chain Financing," filed Jun. 8, 2005, as U.S. patent application Ser. No. 11/147,204. The specification and drawings of the above application are specifically incorporated herein by reference.

This patent application is related to: (1) an issued U.S. patent entitled "Supply Chain Financing System and Method," issued on Dec. 26, 2000, as U.S. Pat. No. 6,167,385, (2) co-pending utility patent application entitled "Trade Receivable Processing Method and Apparatus," filed Feb. 28, 2002, as U.S. patent application Ser. No. 10/085,977, (3) co-pending utility patent application entitled "System And Method For Trade Payment Exchange," filed Jan. 30, 2004, as U.S. patent application Ser. No. 10/767,445, and (4) co-pending utility patent application entitled "System And Method For Integrating Trading Operations Including The Generation, Processing And Tracking Of Trade Documents," filed Jan. 31, 2000, as U.S. patent application Ser. No. 09/495,393. The above patents and application are collectively referred to as "Related Systems and Methods". The specifications and drawings of the Related Systems and Methods are specifically incorporated herein by reference.

FIELD OF THE INVENTION

This invention relates generally to systems and methods for enhancing trade transactions, more particularly, to systems and methods that utilize supply chain event data and information to enhance the processing of letters of credit and effect settlement and assurance of a trade transaction.

BACKGROUND OF THE INVENTION

Commercial trade and finance is complex, expensive, and paper-intensive. Both buyers and vendors are required to prepare, exchange, and process numerous commercial and financial documents associated with each transaction. High-volume exporters and importers, for example, are particularly faced with overwhelming paperwork, expense, and administrative challenges.

Presently, commercial trade transactions involve a rudimentary yet error-prone process. Assume, for example, that a buyer located in the United States wants to purchase goods from a vendor in the Philippines. To initiate the transaction, the buyer will customarily prepare and submit to the vendor a purchase order containing information such as the items or products desired, the quantity, and other relevant details, such as expected delivery date and location, for example. The buyer may also include financing documents, such as a letter of credit, for example, which may be prepared by the buyer's bank and help to speed up the order. A letter of credit is a binding document that a buyer can request from his bank in order to guarantee that the payment for goods will be transferred to the vendor. Basically, a letter of credit gives the vendor reassurance that he will receive the payment for the goods. In order for the payment to occur, the vendor has to present the bank with the necessary shipping documents confirming the delivery of goods within a given time frame. Letters of credit are often used in international trade to eliminate risks such as unfamiliarity with the foreign country, customs, or political instability. Letter of credit processing may also require compliance with third party requirements, such as customs or other like governmental entities.

Upon receiving the purchase order and financing documents from the buyer, the vendor will deliver a request for payment (or invoice) to the buyer along with shipping documents detailing delivery date and location, for example. The buyer reviews these documents for accuracy and completeness and arranges for or authorizes payment, usually through its bank. The exchange of documents between buyers and vendors is commonly done through standard mail delivery systems, such as government mail services and private express delivery services, for example. More sophisticated buyers and vendors may use more immediate forms of communication, such as the Internet and other forms of electronic communication, such as, for example, the various systems and methods described in the Related Systems and Methods.

Though existing electronic systems and methods—including the Related Systems and Methods—are capable of, among other things, electronically processing and generating purchase orders and invoices, and arranging financing and payment, there is a need for systems and methods that simplify and enhance the processing of letters of credit and the settlement or assurance of a trade transaction in an efficient and reliable manner. In particular, there is a need for systems and methods that utilize supply chain event data (e.g., the condition or location of a good or product throughout the supply chain) to modify or adjust terms and requirements of the trade (e.g., payment or other terms within a letter of credit), and/or to effect settlement or assurance of the trade transaction in a more granular or real-time manner.

These and other problems exist.

SUMMARY OF THE INVENTION

An object of the present invention is to overcome the aforementioned and other drawbacks existing in prior art systems and methods.

According to various embodiments, the systems and methods described herein may utilize supply chain event data or information (e.g., the condition or location of products or goods throughout the supply chain) to modify or alter the terms and requirements of a particular trade transaction, or to effect settlement or assurance of the trade in a granular or real-time manner. In some embodiments, supply chain event data or information may be used in conjunction with: (1) existing letter of credit processing systems and methods (e.g., the manual processing of letters of credit by a bank); (2) the various modules described herein for electronically processing (e.g., modifying or altering) the terms or requirements of a trade transaction, such as the payment or other terms set forth in a letter of credit, for example; (3) the various modules described herein for electronically effecting settlement or assurance of a particular trade transaction.

In some embodiments, the systems and methods described herein may include modules that gather data from a product supply chain to enhance the existing processes of trade via letters of credit. The data may be gathered electronically or manually from logistic events, and may be used to trigger pre-agreed changes in commercial terms and/or automatically trigger financial settlement or assurance for individual transactions. In some embodiments, the systems and methods described herein may also be process compliance requirements (e.g., customs) to drive the modification of commercial terms of trades based on location of goods in supply chain, condition of the goods, and other like data to achieve settlement.

In some embodiments, the systems and methods described herein may eliminate the need for traditional letters of credit. For example, in some embodiments, the systems and methods described herein may gather data from the supply chain to leverage enable trading partners to completely or partially settle entire transactions based on information gathered electronically or manually from the logistic events. The systems and methods described herein may increase the flexibility of commercial terms for trades not requiring a letter of credit and increase the assurance of compliance with these terms. Thus, several trading partners that are well-known to each other may conduct trade without a letter of credit by relying on the systems and methods described herein to manually or electronically track particulars of the products or goods (e.g., location/condition/delivery status) to build, modify, amend, revise, or alter terms or requirements of trade. For example, settlement may take place all at once, or be broken into pieces, such as when supply chain events occur or are achieved. For example, the buyer may authorize a ⅓ payment when the goods reach the port of exit, ⅓ payment at midpoint, and ⅓ when it gets to point of entry. Tracking technology may include sensing systems or techniques that may determine location and/or condition of good, whether container has been opened, for example. Other particulars may of course be monitored. In some embodiments, such particulars may be monitored by any party to the transaction or by a third-party provider that performs on-site inspections of goods in transit, for example.

In some embodiments, the systems and methods described herein may also enable a buyer or vendor to resolve problem(s) while the goods are still in transit, rather than waiting for them to be delivered. For example, a buyer may receive a report during shipment that the lettuce he ordered is rotten, thus allowing the buyer to do something about it then, rather than wait for delivery. In some embodiments, the systems and methods described herein may integrate with assurance/insurance systems to further enhance the trade process.

In some embodiments, the systems and methods described herein may utilize value algorithms (e.g., diminished or enhanced) to facilitate more effective valuation of salvageable goods. For example, if temperature during shipment goes above an allowable limit, say 90 degrees, then the deal may be called off, and no payment will be made. However, if the temperature goes between 85 and 90 degrees, then 50% of the value will be paid because the goods may still be salvageable. Supply chain event data or information, for example, may then be processed by the value algorithms to determine what modifications or alternations need to be made to the terms or requirements of the transaction. Value algorithms may therefore be used to process supply chain event data to enhance the processing of letters of credit or effect settlement or assurance of trade transactions. In some embodiments, the use of value algorithms may overcome current "all or nothing" trade arrangements, where valuations are predetermined by the buyer and vendor on the front end of the deal without the subsequent ability to modify or adjust terms or requirements in response to supply chain event data or information. In some embodiments, value algorithms may be maintained and updated on a database, file storage system, or other storage means, and may be accessed by the various systems and methods described herein.

According to one embodiment of the present invention, a system for processing particulars of a transaction over a network is provided. The system comprises a supply chain tracking module for receiving supply chain event data from at least one supply chain monitor, the supply chain data relating to the condition or location of an item along a supply chain; and a term and requirements module for receiving initial terms and requirements associated with the transaction and for generating modified terms and requirements based on supply chain event data and on at least one value algorithm, the modified terms and requirements being generated while the item is still in the supply chain.

In some embodiments of the present invention, a method for processing supply chain transactions is provided. The method comprises the steps of receiving initial terms and requirements associated with the transaction; receiving supply chain data from at least one supply chain monitor, the supply chain data relating to the condition or location of an item along a supply chain; and generating revised terms and requirements by modifying the initial terms and requirements based on supply chain event data and on at least one value algorithm while the item is still in the supply chain.

In yet another embodiment of the present invention, a system for processing particulars of a transaction over a network. The system comprises supply chain tracking means for receiving supply chain event data from at least one supply chain monitor, the supply chain data relating to the condition or location of an item along a supply chain; term and requirements means for receiving initial terms and requirements associated with the transaction and for modifying the initial terms and requirements based on supply chain event data; and settlement means for settling the transaction based on the modified terms and requirements.

The accompanying drawings, which are incorporated in and constitute a part of this specification, illustrate various embodiments of the invention and, together with the description, serve to explain the principles of the invention.

DETAILED DESCRIPTION OF THE INVENTION

Figure 1:
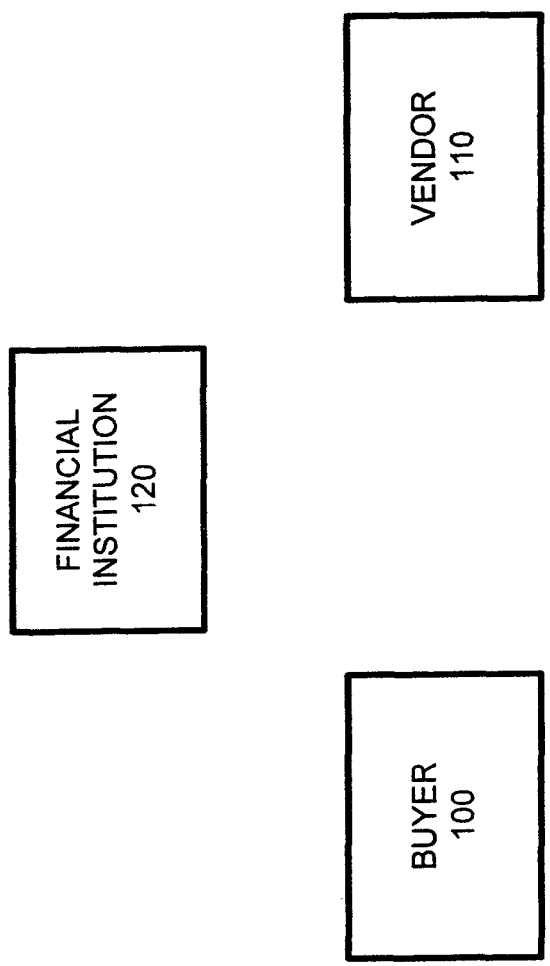
FIG. 1 is a block diagram illustrating the typical parties to a trade transaction, namely, the buyer, financial institution, and vendor.

Reference will now be made to the present preferred embodiments of the invention, examples of which are illustrated in the accompanying drawings in which like reference characters refer to corresponding elements.

The present invention is described in relation to a system and method for exchanging information and documents related to international trade transactions. Nonetheless, the characteristics and parameters pertaining to the system and method may be applicable to transactions associated with other types of content and/or industries, to include domestic trade, for example.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Among many potential uses, the systems and methods described herein may be used to: (1) permit the modification or alteration of trade terms or requirements (e.g., letters of credit terms regarding payment and other factors), real-time or otherwise, based on supply chain event data or information; (2) allow parties to a trade transaction—the buyer, vendor, financial intermediary, and any third party(ies), such as freight forwarders, supply chain monitors, customs brokers, shipping companies, government agencies and officials (e.g., FDA), and/or any individual or entity involved with the movement or shipment of goods or services related to the trade transaction to manually or automatically (e.g., electronically) obtain or provide supply chain event data or information; (3) allow full or partial settlement of transactions based on supply chain event data or information, for example; (4) obtain assurance for goods or products in transit based on supply chain event data or information; and (5) allow any party to the transaction to manually or automatically determine and provide the location, condition, or other particulars of a product or good through the supply chain process.

In some embodiments, the systems and methods described herein may include or comprise a supply chain payment engine or module that processes supply chain event data or information to enhance letters of credit processing and to effect settlement or assurance of a trade transaction. In some embodiments, the supply chain payment engine or module may be operated or administered by an intermediary financial institution, such as a bank, for example, that otherwise facilitates the processing of documents—such as purchase orders, requests for payment (invoices), letters of credits, and shipment documents, for example—received in connection with a particular trade transaction. Such documents may be received by the intermediary financial institution via facsimile, mail, electronic mail, or any other form of communication, electronic (such as Electronic Data Interchange (or EDI)) or otherwise. The documents may be electronically imaged by the buyer or vendor prior to transmission to the bank, or by the bank upon receipt.

FIG. 1 illustrates each of the parties that may be part of a trade transaction: the buyer (importer) 100, the vendor (exporter) 110, and the financial institution 120. According to one embodiment of the present invention, the financial institution 120 may serve as an intermediary between the buyer and vendor and may channel, collect, organize, and maintain, for example, documents or other data relating to the trade transaction. In some embodiments, the financial institution 120 may be any bank, institution, business entity, organization, partnership, association, corporation, or individual that serves as an intermediary between the buyer and vendor. Alternatively, the functions of the intermediary may be performed by the buyer and/or the seller, or any other entity or individual affiliated therewith.

Figure 2:
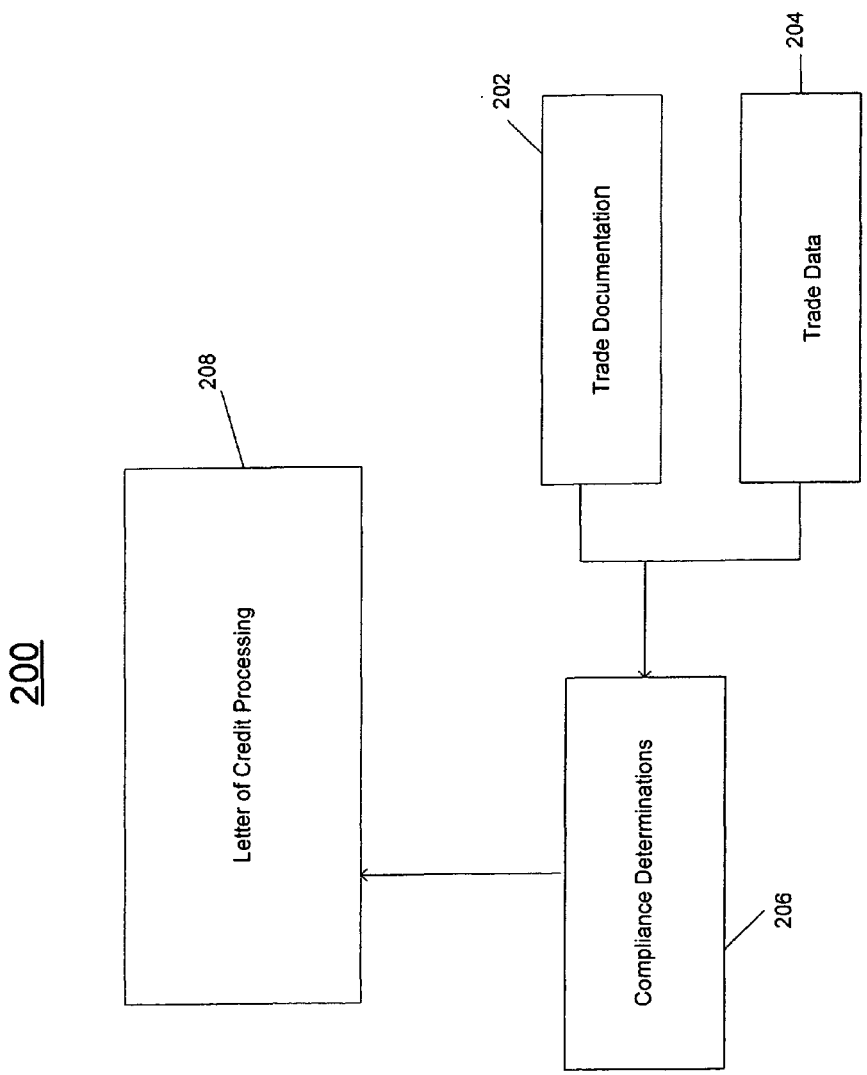
FIG. 2 is a prior art process flow 200 for processing letters of credit documents associated with a transaction.

FIG. 2 depicts a typical prior art process 200 for processing letters of credit. Typically, process 200 is administered by a financial institution that has been tasked with the responsibility of processing letters of credit associated with a particular trade transaction. As shown, letter of credit processing 208 typically comprises the processing and analysis of trade documents 202 and trade data 204 to determine compliance 206 with the particular terms and requirements of an associated letter of credit. Such compliance determinations may comprise terms and requirements agreed upon by the vendor and buyer, as well as requirements of a third party entity, such as customs or other governmental agency, for example. Trade documents 202 may comprise documentation obtained from any party in the supply chain (e.g., a third party logistics provider) that sets forth particulars about the goods or products in transit. For example, trade documents 202 may comprise shipping documents obtained from the various ports of call the products or goods passed through during shipment. Trade data 204 may comprise data or information about the number of goods or products, type of trade transactions, trade routes taken, and other trade-related data or information, for example.

Typically, most terms and requirements—either those agreed upon by the parties to the trade (e.g., buyer and vendor) or those set forth by third parties such as customs, for example—are determined before the products and goods and sent in transit. Accordingly, there is no ability to modify or alter these terms or requirements based on events that occur during shipment or transit. For example, if a delay takes place at a particular port of call, there is no way to modify the terms or requirements associated with the letter of credit or customs, for example, to account for the unexpected delay. Moreover, there is no known system or method that enables the parties to timely react or respond to the unexpected delay, such as by effecting early settlement (full or partial) in view of the change of circumstances, or to outright terminate the transaction.

Figure 3:
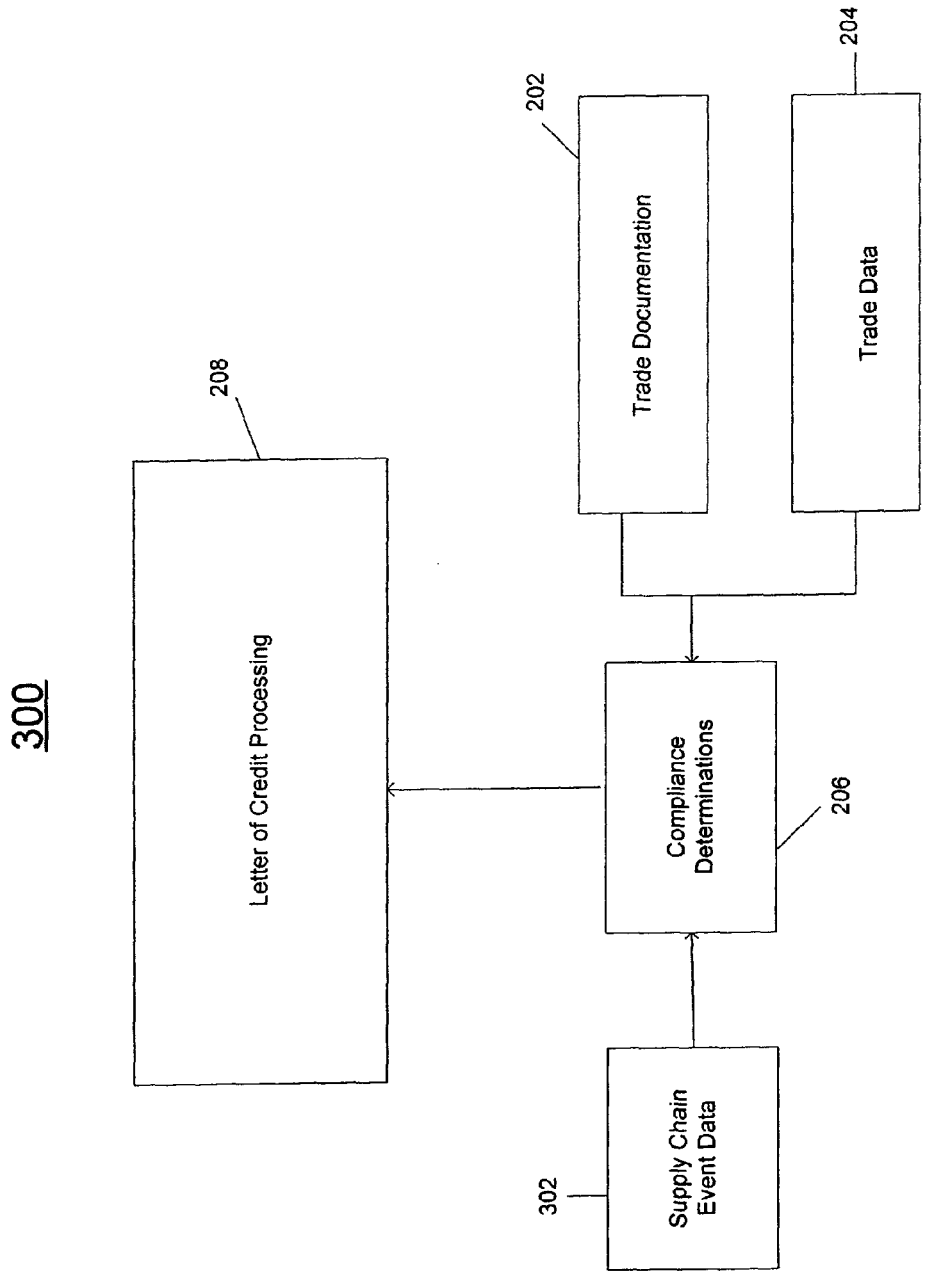
FIG. 3 is a process flow 300 for processing letters of credit documents, according to one embodiment of the invention.

FIG. 3 depicts one embodiment of a process 300 that is essentially the same as system 200 described in FIG. 2 but which further incorporates supply chain event data or information 302 in making compliance determinations 206. In some embodiments, supply chain event data or information 302 may comprise data or information about a product or good's location, condition, or other factor throughout the supply chain process. For example, the condition of a perishable item during shipment may be used to change terms or requirements (e.g., payment terms) of a trade transaction, such as the terms or requirements of a letter of credit, for example. Similarly, whether a particular item is currently out-of-stock or in limited supply may also be used to modify or alter the terms or requirements of a trade transaction. Other factors may be used to modify or alter terms or requirements of a trade transaction.

In some embodiments, supply chain event data or information 302 is obtained and provided by any entity or individual along the supply chain. For example, a vendor, buyer, shipper, carrier, or any third party may monitor the conditions of products or goods in transit and provided such information for consideration in the processing of letters of credit. For example, if the buyer and vendor originally agree upon a certain price for shipment and delivery of certain products or goods by a specified date, the fact that the products or goods are being delayed may be used to reduce the price accordingly.

Figure 4:
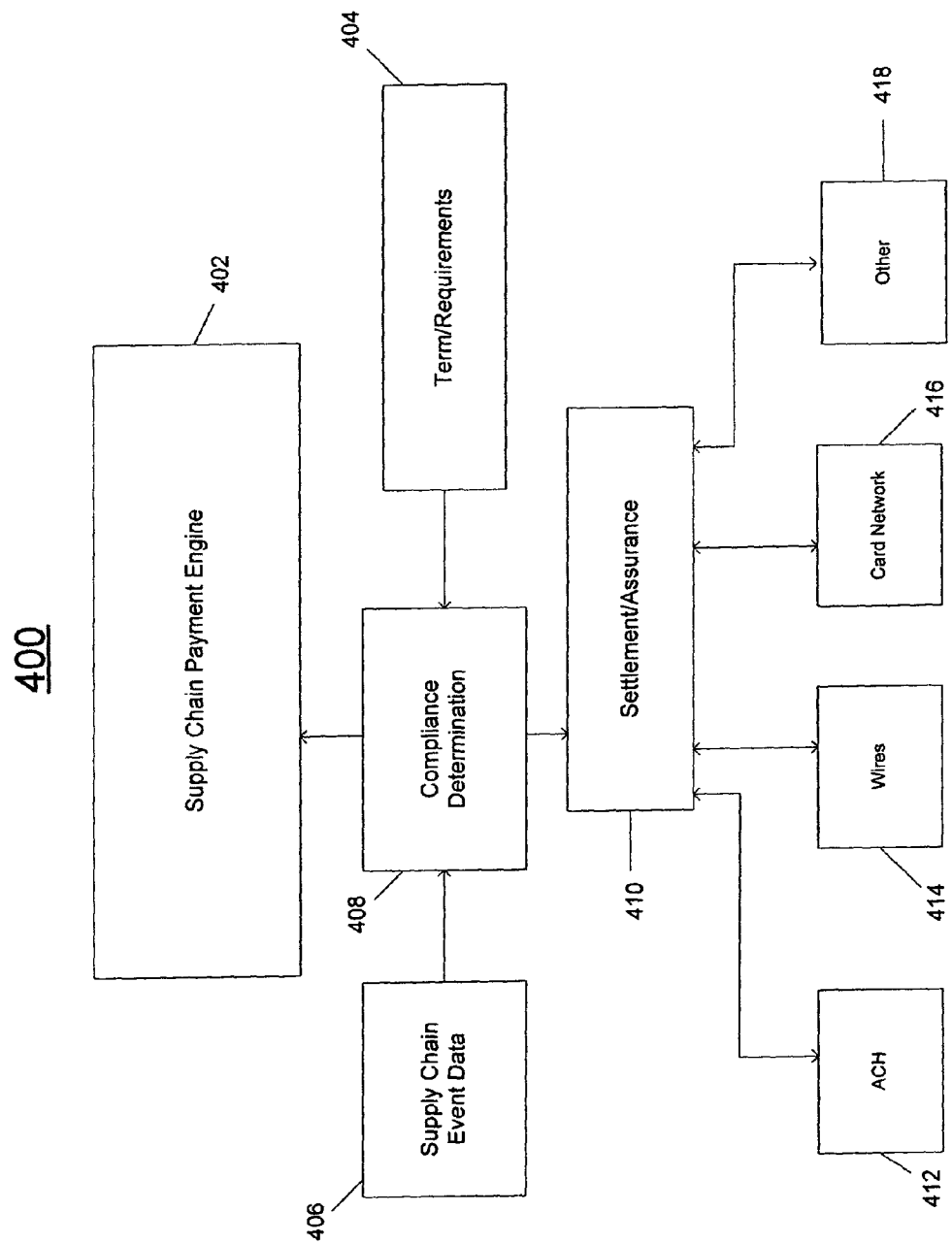
FIG. 4 is a process flow 400 for processing settlement and payments associated with a transaction, according to one embodiment of the invention.

FIG. 4 depicts one embodiment of a process 400 that is uses a supply chain payment engine or module 402 for processing letters of credit and effecting full or partial settlement or assurance of a trade based on supply chain event data or information 406. As shown, supply chain payment engine or module 402 may comprise modules that make compliance determinations 408 based on terms or requirements 404, such as terms or requirements that have been agreed upon by the buyer and vendor in a trade transaction and other terms and requirements set by a third party such as customs or other governmental agency, for example. In some embodiments, such modules may also account for supply chain event data or information 406 that indicates particulars about the trade transaction, such as the location, condition or other factor of the product or good being traded. For example, the original terms and requirements of a trade transaction may be modified or altered as necessary based on supply chain event data or information 406.

In some embodiments, supply chain payment engine or module 402 may also comprise modules that effect settlement or assurance 410 of a trade transaction. For example, in some embodiments, the supply chain payment engine or module 402 may gather data from the supply chain to enable trading partners to completely or partially settle entire transactions based on information gathered electronically or manually from the logistic events. Thus, several trading partners that are well-known to each other may conduct trade without a letter of credit by relying on supply chain payment engine or module 402 to track particulars of the products or goods (e.g., location/condition/delivery status) and build, modify, amend, revise, or alter terms or requirements of trade. For example, settlement may take place all at once, or be broken into pieces, such as when supply chain events occur or are achieved. For example, a ⅓ payment may be made when the goods reach the port of exit, a ⅓ payment at midpoint, and a ⅓ payment when they get to the port of entry. In some embodiments, such payments may be arranged or effected through an automated clearinghouse (ACH) 412, wire 414, card network 416, or other payment system or method 418.

In some embodiments, supply chain payment engine or module 402 may cooperate with tracking systems or methods, such as sensing systems or techniques that determine location and/or condition of good, whether container has been opened, for example. Other particulars may of course be monitored and tracked. In some embodiments, such particulars may be monitored by any party to the transaction or by a third-party provider that performs on-site inspections of goods in transit, for example.

Figure 5:
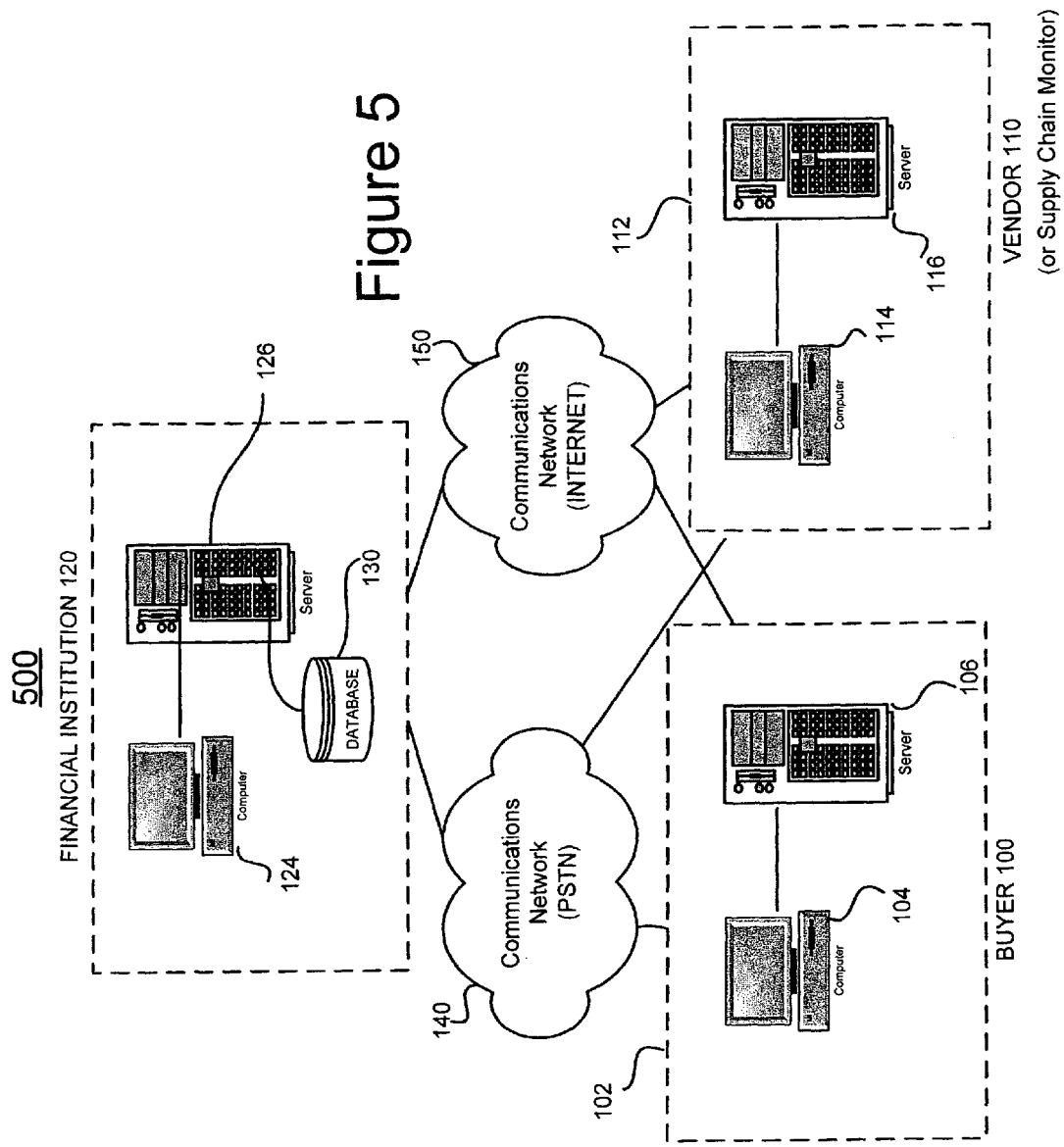
FIG. 5 is a block diagram illustrating a system 500 for enhancing trade transactions, according to one embodiment of the invention.

FIG. 5 is a comprehensive block diagram illustrating one embodiment of the present invention. Systems 102, 112, and 122 may correspond to buyer 100, vendor 110, and financial institution 120, respectively, and may be interconnected by communication networks 140 and 150. Systems 102, 112, and 122 may be used to send and receive the various data, information or documents associated with a given trade transaction, such as purchase orders, invoices, financing documents (e.g., letters of credit), shipping documents, payments, or supply chain event data or information, for example.

Communications network 140 preferably comprises a telephone communications network, such as the Public Switched Telephone Network (PSTN). In some embodiments, communications network 140 may comprise a Personal Branch Exchange (PBX), which may further connect to the PSTN. Communications network 140 may be used by the buyer 100, vendor 110, and financial institution 120, for example, to transmit and receive transmissions of documents, including but not limited to purchase orders, financial documents (e.g., letters of credit), requests for payment (invoices), shipping documents, and any other trade-related document or information, for example. For instance, the third party logistics providers transmit supply chain event data or information for processing according to the various systems and methods described herein. Voice communication between the parties is also possible over communications network 140.

Communications network 150 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection. Communications network 150 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 150 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

Communications network 150 may be used by buyer 100, vendor 110, and financial institution 120 to transmit and receive trade-related data, information or documents, including but not limited to purchase orders, financial documents (e.g., letters of credit), requests for payment (invoices), payments shipping documents, supply chain event data or information, or any data or information used to enhance the processing of letters of credit or to effect settlement or assurance of a trade transaction, for example. For instance, the buyer, vendor and/or financial institution in a trade transaction, for example, may receive supply chain event data or information via network 150 that may be used to enhance the processing of letters of credit or to effect settlement or assurance of the trade transaction.

Systems 102, 112, and 122 each may respectively comprise computer or client stations 104, 114, and 124 and servers 106, 116, and 126. Each is described in more detail.

Client stations 104, 114, and 124 may comprise or include, for instance, a personal or laptop computer running a Microsoft Windows™ 95 operating system, a Windows™ 98 operating system, a Millenium™ operating system, a Windows NT™ operating system, a Windows™ 2000 operating system, a Windows XP™ operating system, a Windows CE™ operating system, a PalmOS™ operating system, a Unix™ operating system, a Linux™ operating system, a Solaris™ operating system, an OS/2™ operating system, a BeOS™ operating system, a MacOS™ operating system, a VAX VMS operating system, or other operating system or platform. Client stations 104, 114, and 124 may include a microprocessor such as an Intel x86-based or Advanced Micro Devices x86-compatible device, a Motorola 68K or PowerPC™ device, a MIPS device, Hewlett-Packard Precision™ device, or a Digital Equipment Corp. Alpha™ RISC processor, a microcontroller or other general or special purpose device operating under programmed control.

Client stations 104, 114, and 124 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Client stations 104, 114, and 124 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Client stations 104, 114, and 124 may also include a network-enabled appliance such as a WebTV™ unit, a radio-enabled Palm™ Pilot or similar unit, a set-top box, a networkable game-playing console such as a Sony™ Playstation™, Sega™ Dreamcast™ or a Microsoft™ XBox™, a browser-equipped or other network-enabled cellular telephone, or another TCP/IP client or other device.

Client stations 104, 114, and 124 may be utilized by a buyer, vendor or financial institution to input data or information or create documents related to a given trade transaction, including but not limited to purchase orders, financial documents (e.g., letters of credit), requests for payment (invoices), shipping documents, supply chain event data or information, or any data or information used to enhance the processing of letters of credit or to effect settlement or assurance of a trade transaction, for example. In some embodiments, for example, a buyer may interface with a graphical user interface (or GUI) to input information in a predetermined form related to purchase order details. A vendor may likewise interface with a GUI to input information relating to an invoice or request for payment, for example. A financial institution may interface with a GUI to manually or automatically input information relating to a financial document, such as a letter of credit associated with a particular trade transaction. All parties may further interact with a GUI in client stations 104, 114, and 124, for example, to provide, receive, or access supply chain event data or information or to provide, update or maintain value algorithms, each of which may be used by the various systems and methods described herein to enhance the processing of letters of credit or to effect settlement or assurance of a trade transaction.

Servers 106, 116, and 126 may each comprise a single server or engine (as shown). In some embodiments, servers 106, 116, and 126 may comprise a plurality of servers or engines, dedicated or otherwise, which may further host modules for performing desired system functionality. In some embodiments, servers 106, 116, and/or 126 may comprise a supply chain payment engine or module 402 described in FIG. 4. Servers 106, 116, and 126, for example, may host one or more applications or modules that function to permit interaction between the users (e.g., buyers, vendors, financial institutions and other parties) as it relates to exchanging information and documents related to the processing of trade transactions, for example. For instance, the servers 106, 116, and 126 may include an administration module that serves to permit interaction between the system and the individual(s) or entity(ies) charged with administering systems 102, 112, and 122. Servers 106, 116, and 126 may further include module(s) that utilize supply chain event data or information to enhance the processing of letters of credit or to effect full or partial settlement of a trade transaction based on such supply chain event data or information, for example (See FIG. 6). Other modules may permit users to access and view documents or information over a network which relate to a particular trade transaction.

Servers 106, 116, and 126 may include, for instance, a workstation or workstations running the Microsoft Windows™ XP™ operating system, Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

Database 130 may comprise, include or interface to an Oracle™ relational database such as that sold commercially by Oracle Corporation. Other databases, such as an Informix™ database, a Database 2 (DB2) database, a Sybase database, an On Line Analytical Processing (OLAP) query format database, a Standard Query Language (SQL) format database, a storage area network (SAN), a Microsoft Access™ database or another similar data storage device, query format, platform or resource may be used. In some embodiments, database 130 may comprise a file storage or other storage system or method.

In some embodiments, database 130 may store and maintain value algorithms that process supply chain event data or information as described herein. Such value algorithms may be provided by a buyer, vendor, or any other authorized party to a trade transaction and be used to drive subsequent transactions. For example, value algorithms may specify what changes or modifications may be made to the terms or requirements of a letter of credit should certain events occur during the shipment or transit of goods or products. A reduction in the quality of a perishable item, for example, may result in a reduction of the price to be paid by the buyer. Similarly, value algorithms may be used to account for enhancements in the value or quality of a product, such as might result from early delivery of perishable items, for example. Value algorithms may also be used by the various systems and methods described herein to effect full or partial settlement of the transaction based on supply chain event data or information.

Figure 6:
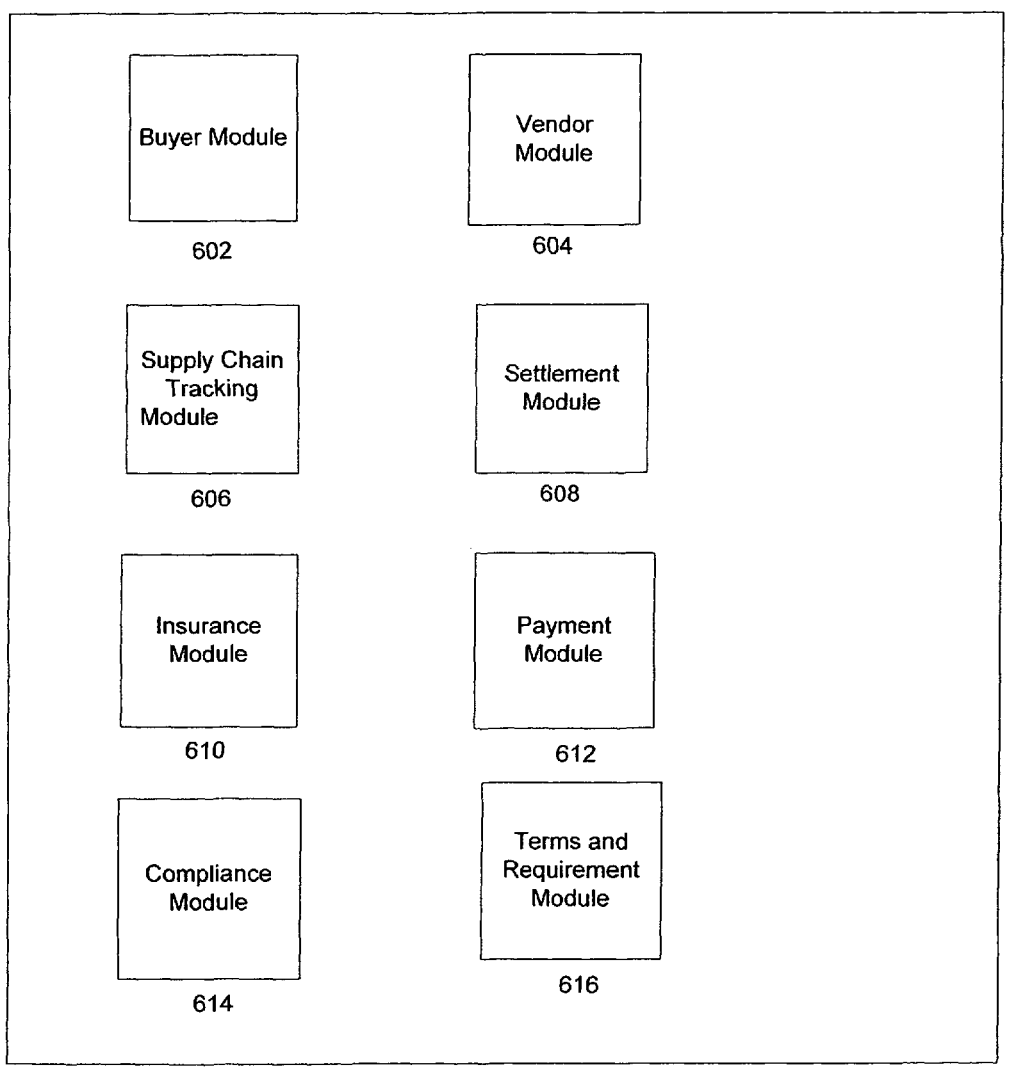
FIG. 6 is a block diagram illustrating exemplary modules associated with the system of FIG. 5, according to one embodiment of the invention.

FIG. 6 illustrates exemplary modules that may be associated with any or all of the servers 106, 116 and/or 126 (e.g., supply chain payment engine or module 402) for carrying out (or administering) the various functions and features of the invention described herein. In some embodiments, the modules may be accessed by a buyer, vendor, financial intermediary, or any other third party, for example, through appropriate graphical user interfaces (or GUI). While the modules may not be necessary to perform some or all of the functions of the present invention, they are nonetheless presented as possible embodiments:

Buyer module 602 may, in some embodiments, enable interaction between a buyer and supply chain payment engine or module 402. In some embodiments, buyer module 602 may be accessed by a buyer using station 102, for example, to interact with the various features and functionality of system 500, for example. In some embodiments, for example, buyer module 602 may enable the buyer to input data or information relating to a particular trade transaction, such as, for example, initial terms or requirements agreed upon with a vendor, or supply chain event data or information that may relate to the condition, location or other factor of a product or good throughout the supply chain. Other supply chain event data or information may of course be provided. In some embodiments, buyer module 602 may provide the buyer with reports or notifications regarding the status of a trade transaction in the supply chain. For example, if the products or goods the buyer is waiting for get delayed during shipment, buyer module 602 may notify the buyer about the delay. Such reports or notifications may be provided to the buyer via client station 102, for example.

In some embodiments, buyer module 602 may cooperate with any of the other modules described herein to enable the buyer to provide and receive data or information relating to the processing of letters of credit, or to effect settlement or assurance of trade transactions based on supply chain event data or information. For example, buyer module 602 may cooperate with supply chain tracking module 606, settlement module 608, payment module 612, compliance module 614, or terms and requirements module 616 to provide or receive supply chain event data or information. Other arrangements are possible.

Vendor (or supply chain monitor) module 604 may, in some embodiments, enable interaction between a vendor and supply chain payment engine or module 402. In some embodiments, vendor module 604 may be accessed by a vendor using station 110, for example, to interact with the various features and functionality of system 500, for example. In some embodiments, for example, vendor module 604 may enable the vendor to input data or information relating to a particular trade transaction, such as, for example, initial terms or requirements agreed upon with the buyer, or supply chain event data or information that may relate to the condition, location or other factor of a product or good throughout the supply chain. Other supply chain event data or information may of course be provided. In some embodiments, vendor module 604 may provide the vendor with reports or notifications regarding the status of a trade transaction in the supply chain. For example, if the products or goods the vendor has shipped get delayed during shipment, vendor module 604 may notify the vendor about the delay. Such reports or notifications may be provided to the vendor via client station 104, for example.

In some embodiments, vendor module 604 may cooperate with any of the other modules described herein to enable the buyer to provide and receive data or information relating to the processing of letters of credit, or to effect settlement or assurance of trade transactions based on supply chain event data or information. For example, vendor module 604 may cooperate with supply chain tracking module 606, settlement module 608, payment module 612, compliance module 614, or terms and requirements module 616 to provide or receive supply chain event data or information. Other arrangements are possible.

Supply chain tracking module 606 may, in some embodiments, be used by any party to a trade transaction, for example, to provide supply chain event data or information relating to the trade transaction, such as where in the process goods or products may be located, the conditions of such goods or products, or any other particulars of the goods or products that may have bearing on the terms or requirements of the trade transaction. For example, a third party may use supply chain tracking module 606 to indicate that the conditions of the goods or products have unexpectedly deteriorated during transit, or that the products or goods will be arriving early. In some embodiments, tracking module 220 may comprise (or be associated with) a third party tracking system, such as a global positioning system (GPS), courier-type tracking service, RFID-based tracking system, or any other system or method that manually or automatically (e.g., electronically) monitors particulars of products, goods or items throughout the supply chain, for example.

In some embodiments, supply chain tracking module 606 may cooperate with any of the other modules described herein to enhance the processing of letters of credit or to effect settlement or assurance of trade transactions based on the supply chain event data or information. For example, supply chain tracking module 606 may cooperate with settlement module 608, payment module 612, compliance module 614, or terms and requirements module 616 to provide or receive supply chain event data or information. In some embodiments, supply chain event data or information obtained through Other arrangements are possible.

Settlement module 608 may, in some embodiments, determine whether settlement (full or partial) may be desired based on supply chain event data or information obtained through supply chain tracking module 606, for example. In some embodiments, settlement determinations may be based on any conditions determined by the buyer and/or vendor in anticipation of the transaction. For example, the buyer and vendor may agree that price changes may result from any unexpected changes or conditions throughout the supply chain. Thus, if the goods are delayed during shipment the price may be reduced accordingly. Likewise, if the goods arrive earlier than promised or in a better condition than expected the price may be increased accordingly. In some embodiments, settlement determinations made by settlement module 608 may be according to value algorithms maintained and stored by system 500, such as value algorithms stored and maintained in database 130, for example.

Insurance module 610 may, in some embodiments, be used to insure goods or products in trade transaction. In some embodiments, products or goods may be insured to avoid loss due to a change in circumstance during the supply chain. For instance, assume a particular shipment of goods is in the open seas heading toward a hurricane (or war torn country), for example. The buyer, vendor, or financial intermediary may decide to obtain additional insurance against destruction or loss of the goods. In some embodiments, insurance module 610 may cooperate with the insurance department of the financial intermediary, or with a third party provider, for example, to facilitate the insurance process. Insurance module 610 may also cooperate with supply chain tracking module 606 to determine the exact location, condition, or other particular(s) of the goods or products in shipment, for example. This may enable any party to the trade transaction to readily obtain insurance in an ad-hoc or impromptu manner, for example.

Payment module 612, for example, may be used to facilitate payment of goods purchased, for example. In some embodiments, payment module 612 may be used by the buyer, for example, to present payment to the vendor after settlement takes place. Payment may be made directly to the vendor, or to the appropriate financial institution, for example. In some embodiments, payment module 612, in conjunction with settlement module 606, for example, may be used to automatically trigger payment of a shipment upon a particular or predetermined occurrence, such as entry of the shipped goods into U.S. territory, for example. Payment module 612 may work in conjunction with tracking module 220 to track delivery of the goods. Other events or occurrence may be used to trigger or schedule payment.

Compliance module 614 may, in some embodiments, process supply chain event data to determine whether to modify or alter the terms or requirements of a transaction. In some embodiments, compliance module 614 may determine whether to modify or alter terms or requirements of trade based on value algorithms stored within system 500. Such value algorithms may specify modifications or alterations depending on the nature of the supply chain event data or information. For example, if supply chain data or information indicates that the products and goods will be arriving late, value algorithms may adjust the price of the transaction accordingly. In some embodiments, value algorithms may also induce full or partial settlement of the transaction based on the nature of the supply chain event data or information. In some embodiments, compliance module 614 may conduct quota management.

Terms and requirements module 616 may, in some embodiments, enable a buyer, vendor, financial institution, or any authorized third party to input terms and requirements of a trade transaction. In some embodiments, terms and requirements module 616 may also enable a buyer, vendor, financial institution, or any authorized third party to input value algorithms that are used to process supply chain event data or information and thus determine whether to modify terms and requirements of the trade, and/or whether to effect settlement or assurance of the transaction.

Financing module 235 may be used to obtain or offer financing for a particular trade transaction, for example. In some embodiments, financial intermediary 120 may permit the buyer and/or vendor to obtain financing for the transaction or purchases related to the transaction, for example. Such financing may be provided by the financial intermediary itself, or through affiliated third parties. In some embodiments, for example, the vendor 110 may desire immediate payment for a given transaction. In this situation, information from the buyer's purchase order may be used to obtain such financing. Such information may be populated automatically, entered manually, or through some form of optical character recognition (OCR), and immediately provided to the financing department of the financial intermediary 120, for example, to process and expedite a financing program.

Other modules may of course be provided.

Figure 7:
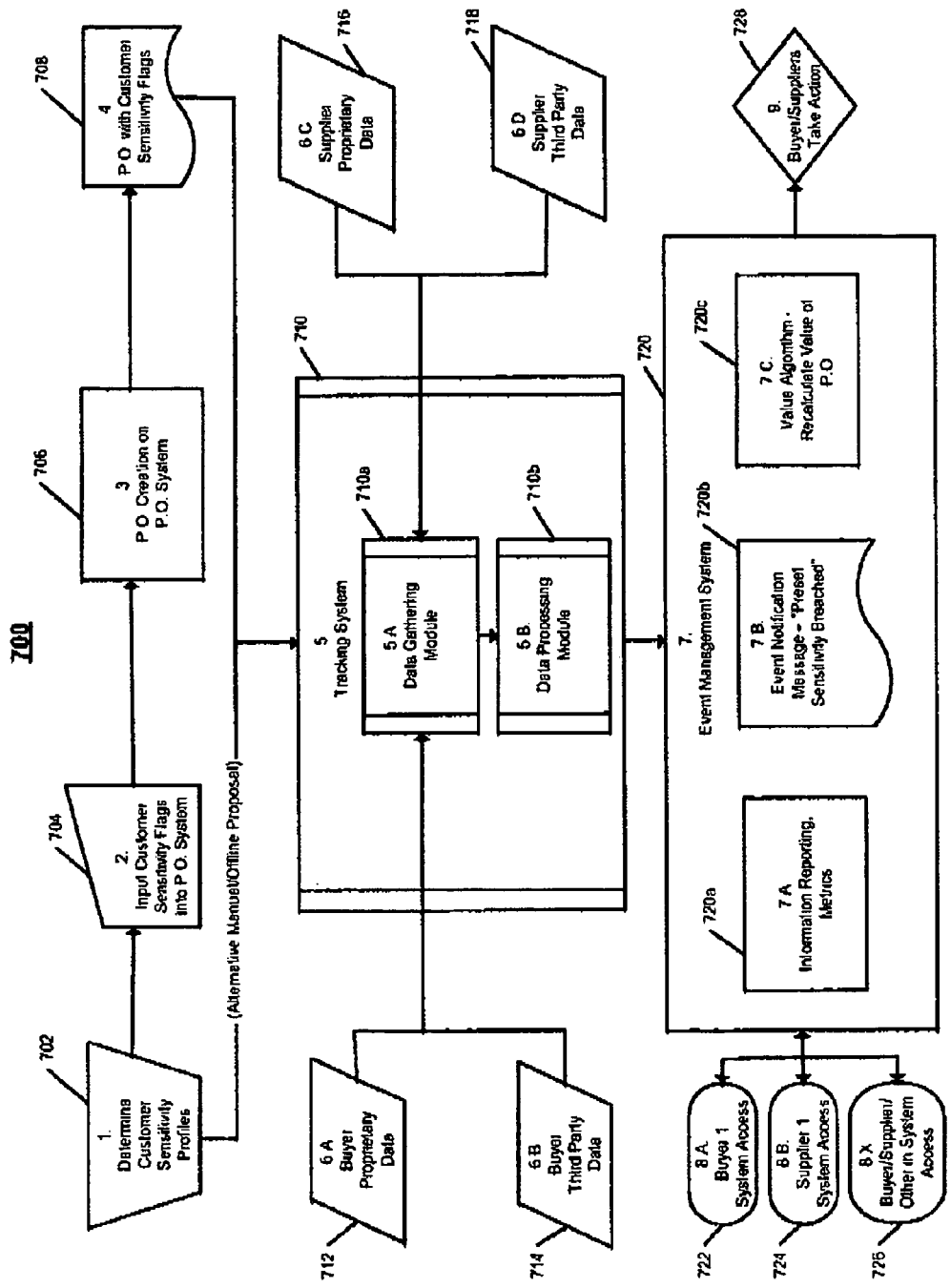
FIG. 7 is a process flow diagram illustrating a method 700 for processing a trade transaction, according to one embodiment of the invention.

FIG. 7 illustrates an embodiments of process flows performed by the various systems and methods described herein. The method is performed from the perspective of a financial institution having a buyer or vendor as a customer. FIG. 7 illustrates a method 700 for processing supply chain event data or information to enhance processing of letters of credit and to effect settlement or assurance of a trade transaction, according to one embodiment of the invention.

At step 702, customer (e.g., buyer or vendor) sensitivity profiles are determined. In some embodiments, such determinations are worked collaboratively with trading partners and bank. In some embodiments, these are the parameters under which a trading partner will receive notification and/or be able to renegotiate purchase orders (P.O.). Subject to a set of rules, the sensitivity profiles will be repeatable for trades of a specific type, or may be designated to apply to any trade involving the customer.

At step 704, the financial institution may input customer sensitivity flags specific to buyer and/or supplier side of transaction into P.O. system (Note—Trading partners could agree to access tracking systems through manual processes with or without bank intervention. Expressed as direct link between Steps 1 and 5, would still require access to output data from 5*b*—Data Processing module)

At step 706, a P.O. is created for a specific transaction between trading partners on P.O. system.

At step 708—P.O. information for a specific transaction between trading partners can now be entered into Tracking System. In some embodiments, the P.O. system would need to be modified to produce P.O. with the customer sensitivity flags embedded therein. In some embodiments, may need to produce some new P.O. settlement rules to accommodate this innovation (e.g. if temperature in container increases above 65 degrees F, the P.O. is subject to reduction in value).

At steps 710*a* and 710*b*—Tracking system consists of Data Gathering and Data Processing modules. P.O. information for a specific transaction is entered into the Tracking System. In some embodiments, a Tracking System Data Gathering Module Receives input from a variety of buyer and/or supplier centric data sources (proprietary and third party). Input could include data from any number of RFID, passive and active scanning systems, environmental sensing systems (temperature, shock, motion, etc.), electronic seals, inspections, databases, etc. In some embodiments, data received and compiled by the Data Gathering Module is processed and delivered by the Tracking System to any number of receiving systems including an Event Management System as described in the flow diagram.

Steps 712, 714, 716 and 718—Various sources of buyer/supplier proprietary information and buyer/supplier sourced third party data are received into the Data Gathering module of the Tracking System. In some embodiments, this can be, but is not limited to, electronically or manually generated supply chain data such as produced by RFID tags or sensing devices, inspection data, data from FX tables, quota information, stock outage information, etc. in a variety of formats.

Steps 720*a*, 720*b* and 720*c*—Data from the Tracking System is received into an Event Management System accessible by the trading partners, 3rd party logistic providers, banks, etc. (Step 8) which includes an information reporting module, an event notification module which will notify trading parties if a sensitivity threshold is breached, and a "Value Algorithm" module that can be used to recalculate the value of P.O. In some embodiments, event notification will most likely look to leverage existing event notification and/or management software or system to provide the event notification feature. In some embodiments, event notification will likely require some modification to whatever system is selected to provide notifications to trading partners. In some embodiments, the value algorithm processing may comprise a system and/or method based upon existing or to be developed logic that will take into account changes in the value of goods and/or services based upon quality, time and/or place. In some embodiments, impact can be positive as well as negative. P.O. system will need to be modified to accommodate the recalculated value of the P.O.

Step 722, 724 and 726—Trading partners and other authorized parties (3rd party logistics providers, banks, etc.) can interface with the Event Management System through a variety of devices (PC, mobile phone, etc.).

Step 728—Trading partners (or other authorized 3rd parties) can use the data generated by the Value Algorithm or other Event Management System module to take any number of actions. In some embodiments, actions may include one or more of the following: Renegotiate price of goods and/or services; Submit trade to independent arbitrator to determine value; Reroute shipment; Order inspection of shipment; Return goods for repair or replacement; Trigger new event (e.g. replacement of order); Trigger settlement (open account or letter of credit); Collaboration with trading partner and 3rd parties.

The following examples demonstrate use of value algorithms and supply chain event data or information to enhance supply chain transactions according to the systems and methods described herein:

EXAMPLE 1

Ocean Delivery Failure

Commodity: Plastic Halloween Pumpkins
Source: China
Situation: Product needs to be delivered to Retailer's Distribution Centers using DDP Incoterms by September 30 in order to be available and on shelves for Halloween promotion. Ocean vessel sails on-time and then encounters a Pacific storm delaying arrival by 2 days. Event manager system (7b) notifies Supplier that shipment is delayed 2 days prior to arrival. Arrangements are made for an expedited trucking service using team drivers. Port congestion resulting from storm delays most shipments an additional 2 days. Only DC's west of the Mississippi will receive product on-time. Event manager system (7b) notifies Supplier and Buyer and (7c) triggers a negotiation on the DDP price to Eastern DC's. The buyer is willing to pay only pennies on the dollar.

The seller negotiates with other western Retailers and offers immediate delivery to their DC's. The seller takes a 20% hit overall, but is happy that the product wasn't rejected outright based on late delivery.

EXAMPLE 2

Temperature Threshold Exceeded

Commodity: Washington State Ice Wine
Source: F&Q Winery outside Seattle, Wash.
Situation: Special Reserve Product can not exceed 40 degrees Fahrenheit. Grapes are harvested immediately after a hard, early frost or ice storm and are to never exceed a chilled temperature from fermentation to the table. Buyer in Germany has ordered 12 cases for a Riesling festival outside of Munich. F&Q Winery is expecting to open an important new market in Germany if the wine is judged favorably in the festival. F&Q Winery arranges for a large, international expedited air service provider to fly the goods to Munich in a chill pack with a temperature sensor. Wine is to be inspected prior to customs clearance. A process failure in the hub results in the wine being left outside for 4 hours on the tarmac in unseasonably hot weather and the chill pack malfunctions. The temperature reaches 80 degrees Fahrenheit inside the pack. Inspection at the Munich airport reveals that the temperature is exceeded. F&Q Winery is notified via Event Manager (7b) and immediately sends another shipment. F&Q Winery collects the shipment and product insurance and doesn't pay the freight for the first shipment. The goods are 'scrapped' at the port prior to paying Duty and VAT. The ice wine wins a Runners-up prize, F&Q Winery gets several large orders for Germany, and somewhere a German customs official complains bitterly that the Americans can't make good wine and tries to figure out what to do with 11 cases of near vinegar.

EXAMPLE 3

Foreign Exchange Rate is Unpredictable

Commodity: Power Supplies
Source: China
Situation: U.S. high-tech firm is buying Power Supplies from China for product to be available for Christmas. The first large order needs to be in manufacturing by early-September in order to meet the massive build schedule and the planned rollout to have the PC's in the channels and stores 1 week prior to Thanksgiving. The US and China have been rattling their sabers and a trade war looks imminent unless China re-values the yuan. The buyer and seller have been in intense negotiations over the last couple of weeks concerning Incoterms and the exchange rate. If the yuan is re-valued anything over 10%, the buyer will regret not having bought from a supplier in Singapore. The product is constrained and competing buyers have been jockeying to lock-in the Singapore supply. The supplier is a relatively new business and claims that they can't agree to a fixed yuan rate.

Finally, a compromise is reached. The power supply will move under the buyer's more favorable ocean contracts, but the final price won't be determined until the goods land in the U.S. If the yuan re-values a negotiation will be triggered. In the meantime, the buyer also places an order on a supplier Singapore to hedge. If the yuan floats, then the Singapore product will also rise in response to the currency market and also due to further constraints in the market as buyers flee the Chinese suppliers. The buyer figures that if the yuan doesn't float in the first several weeks of shipments, he'll still be able to re-sell the Singapore product at a premium later in the planned lifecycle based on the projected constraints in the market.

For the first 3 weeks of shipments, the yuan is fixed. The buyer has now received over 10 containers from Singapore at 10% higher cost and he's beginning to doubt his strategy. Week 4, the yuan floats and appreciates 27%. 5 containers are on a vessel 2 days out. Event manager (7b) notifies seller and buyer and the value algorithm (7c) provides a basis for negotiation. The buyer agrees to a 10% increase due to the exchange rate, knowing full well that the product from Singapore is likely to appreciate at least 5% and probably 10% on the open market. The seller is a part of a consortium of state-backed companies that has been preparing for the yuan re-valuation and is happy with the 10% increase. Both parties agree to an automatic calculation in the value algorithm (7c) based on a set of parameters concerning the exchange rate and a Power Supply Commodity Index. A plant fire in Malaysia further constrains the global power supply market. The buyer takes the product from Singapore and sells it on the market through a distributor in small batches for an average of 15% profit.

Other embodiments, uses and advantages of the present invention will be apparent to those skilled in the art from consideration of the specification and practice of the invention disclosed herein. The specification and examples should be considered exemplary only. For example, the various systems and methods described herein may have application with consumer services as well. In some embodiments, for example, a product ordered for delivery (e.g., perishable items, foods, etc.) may be tracked and payment made depending on the location, condition or other factor of the product. In some embodiments, the various systems and methods described herein may also be used to compensate fleet operators (e.g., truck drivers) based on the location, condition or other factors of the goods or products being moved. The intended scope of the invention is only limited by the claims appended hereto.

What is claimed is:

1. A system for processing particulars of a transaction over a network, comprising:

a supply chain tracking processor for receiving supply chain event data from at least one supply chain monitor, the supply chain data relating to the condition or location of an item along a supply chain; and a term and requirements processor for receiving initial commercial terms and requirements associated with the transaction and for generating modified commercial terms and requirements based on supply chain event data and on at least one value algorithm, the modified commercial terms and requirements being generated while the item is still in the supply chain and wherein the modified terms and requirements result in: (1) a partial or complete settlement of the transaction, or (2) change to the valuation of the transaction or the item.

2. The system of claim 1 wherein the supply chain event data comprises a condition or location of item in the supply chain.

3. The system of claim 1 wherein the at least one supply chain monitor comprises a third party logistics provider.

4. The system of claim 1 further comprising a settlement processor for settling the transaction based on the modified terms and requirements.

5. The system of claim 4 wherein settlement comprises partial settlement of the transaction.

6. The system of claim 1 wherein the modified terms and requirements comprise a change in price of the transaction.

7. The system of claim 1 further comprising an insurance processor for obtaining insurance for the transaction based on the supply chain event data.

8. The system of claim 1 further comprising a payment processor for making payment on the transaction.

9. The system of claim 1 wherein the item comprises a perishable good or product.

10. A method for processing supply chain transactions, comprising:

receiving initial commercial terms and requirements associated with a transaction;

receiving supply chain data from at least one supply chain monitor, the supply chain data relating to the condition or location of an item along a supply chain; and generating, using a processor, revised commercial terms and requirements by modifying the initial commercial terms and requirements based on supply chain event data and on at least one value algorithm while the item is still in the supply chain, wherein the revised terms and requirements result in: (1) a partial or complete settlement of the transaction, or (2) change to the valuation of the transaction or the item.

11. The method of claim 10 further comprising the step of settling at least part of the transaction based on the supply chain data.

12. The method of claim 11 wherein settlement comprises partial settlement of the transaction.

13. The system of claim 10 wherein the modified terms and requirements comprise a change in price of the transaction.

14. The system of claim 1 wherein the supply chain event data comprises a condition or location of the item in the supply chain.

15. The system of claim 1 wherein the item comprises a perishable good or product.

16. A system for processing particulars of a transaction over a network, comprising:

supply chain tracking means for receiving supply chain event data from at least one supply chain monitor, the supply chain data relating to the condition or location of an item along a supply chain;

term and requirements means for receiving initial commercial terms and requirements associated with the transaction and for modifying the initial commercial terms and requirements based on supply chain event data, and wherein the modified commercial terms and requirements result in: (1) a partial or complete settlement of the transaction, or (2) change to the valuation of the transaction or the item; and settlement means for settling the transaction based on the modified terms and requirements.

17. The system of claim 1 wherein the supply chain event data comprises a condition or location of item in the supply chain.

18. The system of claim 1 wherein the at least one supply chain monitor comprises a third party logistics provider.

19. The method of claim 11 wherein settlement comprises partial settlement of the transaction.

20. The system of claim 1 wherein the item comprises a perishable good or product.

21. A method for processing supply chain transactions, comprising:

receiving initial commercial terms and requirements associated with a transaction, wherein the transaction comprises a product or good moving through a supply chain;

receiving supply chain data from at least one supply chain monitor, the supply chain data relating to the condition or location of the product or good along the supply chain, wherein the at least one supply chain monitor comprises a third party logistics provider;

generating, using a processor, revised commercial terms and requirements by modifying the initial commercial terms and requirements based on supply chain event data and on at least one value algorithm while the product or good is still in the supply chain wherein the modified commercial terms and requirements comprise a change in price of the transaction or item or results in a partial or complete settlement of the transaction;

settling at least part of the transaction based on the supply chain data, wherein settlement comprises partial settlement of the transaction.

* * * * *